United States Patent [19]
Stodder et al.

[11] Patent Number: 5,727,890
[45] Date of Patent: Mar. 17, 1998

[54] MULTIPLE-FUNCTION PRINTER WITH COMMON MOUNTING CHASSIS FEEDER/OUTPUT PATH MECHANISMS

[75] Inventors: Samuel A. Stodder, Encinitas; Darren W. Wilcox, San Diego, both of Calif.

[73] Assignee: Hewlett-Packard Company, Palo Alto, Calif.

[21] Appl. No.: 724,296

[22] Filed: Sep. 19, 1996

Related U.S. Application Data

[63] Continuation-in-part of Ser. No. 585,058, Jan. 11, 1996, Pat. No. 5,651,623, which is a continuation-in-part of Ser. No. 145,355, Oct. 29, 1993, abandoned.

[51] Int. Cl.⁶ .................................................. B41J 13/10
[52] U.S. Cl. ........................ 400/624; 358/296; 346/134; 347/218; 400/605; 400/185
[58] Field of Search ......................... 400/624, 625, 400/605, 642, 645, 185; 358/296, 401; 346/134; 347/218

[56] References Cited

U.S. PATENT DOCUMENTS

| | | | |
|---|---|---|---|
| 4,511,904 | 4/1985 | Takahashi | 346/134 |
| 4,729,683 | 3/1988 | Staniszewski | 400/624 |
| 4,802,778 | 2/1989 | Takahashi et al. | 400/624 |
| 5,080,515 | 1/1992 | Engelhardt et al. | 400/624 |
| 5,124,800 | 6/1992 | Hashimoto | 358/296 |
| 5,162,916 | 11/1992 | Stemmel et al. | 358/296 |
| 5,427,462 | 6/1995 | Jackson et al. | 400/624 |

*Primary Examiner*—Christopher A. Bennett

[57] ABSTRACT

A multiple-function printing device provides for picking pages from a stack of sheets in a sheet feeder for roller-driven movement along a first path through a printing station to an output stacker, and for picking pages from a stack of documents in a document feeder for roller-driven movement along a second path through a scanning station to the output stacker, with at least a portion of the first and second paths being commonly shared, the scanning station being underneath the commonly shared path, and with common mechanisms including a first pick and second pick for picking from the document and sheet pages, providing roller-driven movement through the processing stations. A media chassis is provided, including an integral platen, with integral spaced side walls which rotatively mount each of picks on and between at least one of the side walls. A prescan drive roller, a fixed deflector and a gear train are attached to a side wall of the chassis, the latter for driving the respective picks.

13 Claims, 21 Drawing Sheets

MULTIPLE-FUNCTION PRINTER WITH COMMON MOUNTING CHASSIS FEEDER/ OUTPUT PATH MECHANISMS

This application is a continuation-in-part of application Ser. No. 08/585,058, filed Jan. 11, 1996, now U.S. Pat. No. 5,651,623, which was a continuation-in-part of application Ser. No. 08/145,355, filed Oct. 29, 1993, now abandoned.

RELATED APPLICATIONS

This application relates to U.S. Ser. No. 08/144,943 filed Oct. 29, 1993 by Samuel A. Stodder, now U.S. Pat. No. 5,391,009 issued Feb. 21, 1995. It also relates to U.S. Ser. No. 08/724,297 filed Sep. 19, 1996 by Gaarder, Stodder et al. having a common assignee as this application, the disclosure of which is incorporated herein by reference.

BACKGROUND OF THE INVENTION

This invention relates generally to printers and facsimile devices, and more particularly to printers and facsimile devices and their operation which are combined together to form a multiple-function product.

Facsimile devices (i.e., fax machines) have been used for many years, to transmit documents containing text or graphical images through a modem via telephone lines through another modem to a remote destination. In its basic form, a conventional fax machine is used for three separate functions: sending a first document; receiving a second document; and producing a hardcopy printout of the second document. Of course the hardcopy printout is not the actual second document but rather a close facsimile thereof. Thus, sending the contents of the second document via fax avoids going to the trouble, expense and delay of actually delivering the second document to a remote destination.

An enhanced fax machine can also be used to perform two additional functions: producing a hardcopy printout of the first document; and producing a hardcopy printout of a cumulative report showing an itemized listing of date, time, and destination for first documents sent from the fax machine.

It is therefore apparent that a fax machine acts primarily as both a sender (i.e., scanning and transmitting) and receiver of documents, and that the fax machine also acts secondarily as a printer (i.e., printing a facsimile of a second document, printing a copy of a scanned first document, or printing an itemized report) and secondarily as a convenience copier (i.e., scanning/printing a first document).

Both the basic fax machine and the enhanced fax machine just described have used two separate paper paths. One path is dedicated to the first document and typically includes document feeder tray, document paper pick/paper drive system, document scanning station, and document output. Another path is dedicated to the printout (originally roll-fed, now sheet-fed) and typically includes sheet feeder tray, sheet paper pick/sheet drive system, sheet printing station, and sheet output. Typically a chassis was provided to mount the apparatus for feeding sheets to be printed and a separate chassis was used to mount the apparatus for feeding the documents to be scanned. As a result, a fax machine is a bulky, expensive multiple-function device which requires a large number of parts for duplicate paper handling functions. Each of these separate paper paths requires unique chassis structures. These support structures consist of at least one part per path but can easily require several chassis parts. The disadvantages of the prior solution are primarily related to cost and reliability. Generally, cost increases and reliability decreases as the number of parts goes up. This cost increase is not only a function of having to purchase more parts for the product, but is also affected by the cost to design, specify, inspect, deliver, assemble, and service those parts. Likewise, reliability is not only a function of each new part introducing new opportunity for out-of-spec parts, but also failure modes that are associated with the interactions between parts as a whole system. Product cost and reliability have a great impact on the customer. The impact of cost is generally understood. The reliability issues that are aggravated by increased part count as described previously include the following: paper picking, paper transport, paper advance accuracy, paper skew and scan quality.

BRIEF SUMMARY OF THE INVENTION

It is an object of the present invention to provide a fax machine with common feeder/output mechanisms for documents passing through a scanning printing station and for sheets passing through a printing station while minimizing parts, complexity, bulk, cost and increasing reliability.

Another important object is to provide a multiple-function printer/fax machine which is primarily a printer peripheral for a computer as well as primarily a fax machine, having an integrated, shared paper path and common mechanisms including a common chassis for scanning documents on the one hand and for producing hardcopy printout sheets on the other hand.

A related object is to provide dual feeder paths into a common paper pick, with self-actuating shifting means for automatically changing from a printing mode to a scanning mode whenever a document is placed in an automatic document feeder tray and to locate the scanning printing station under the common paper path. This results in the non-printed side of a sheet and the non-printed side of a document being in a face-to-face arrangement, when being outputted to a single output tray or stacker. This face-to-face abutting relationship prevents the smearing of one printed sheet when a document is placed thereover in the output tray or stacker.

A further object is to provide a multiple function machine having a single drive motor for picking individual pages from a stack and for moving individual pages past each processing station, such as a scanning station and/or a printing station, all in a smaller foot print. A related object is to provide gear means on a single media chassis for transmitting power to both an automatic document feeder (ADF) or alternatively to an automatic sheet Feeder (ASF).

An additional object is to provide the aforementioned multiple function machine with a common chassis for integrating ADF insertion; scanning insertion; the pick and drive roller supports; gear train supports; pen door supports; end cover supports; ASF and ADF gear train support and ADF paper transport.

In one embodiment of the invention, the single chassis including two spaced walls which mount the document/sheet transport mechanisms; means for sensing the presence of paper to be scanned; means for picking the paper and supporting the scanner and the ADP; means to easily insert the ADF; means to support a gear train for governing paper picking and advance of both paper sheets and paper documents, including photographs and the like; means for supporting the tray that feeds both paper inserts; and which provides structural support for the product door and end covers.

When using a common paper path for scanning and printing, media that feeds through the device can range from original sheet stock to highly curled, bent or otherwise deformed documents. Provisions are made in this invention to properly move the media from roller to roller without incurring paper jams. Sheet media for printing is typically in good form and does not always require a paper path constraint on both faces of the paper. For a translating carriage type printer (i.e. typical inkjet printer), the space above the paper in the printing region is used for moving the print cartridge across the paper in close proximity. Documents for scanning can be in bad form and have been found to require top and bottom face constraint throughout the paper path. Further the relocation of the scanning station under the document and under the common paper path provide a face-to-face orientation of the non-used sides of the printed sheet and a document when being placed in a common output tray or stacker.

The advantages of the invention are founded on decreased cost and increased reliability. The cost goal is met by integration of functions into a common media chassis rather that procuring numerous separate parts. Likewise, the reliability is improved through integration by avoiding increased individual part variation and part-to-part interaction problems as a system.

DETAILED DESCRIPTION OF THE PREFERRED EMBODIMENTS

Generally speaking, the invention provides for picking pages from a stack of sheets in an input feeder (ASF) for roller-driven movement along a first path through a printing station to an output, and for picking pages from a stack of documents in an input feeder (ADF) for roller-driven movement along a second path through a scanning station to an output. Depending on the particular implementation, at least a portion of the first and second paths are commonly shared, and common mechanisms are used at least in part for various steps such as for picking and providing roller-driven movement through the processing stations.

Figure 1:
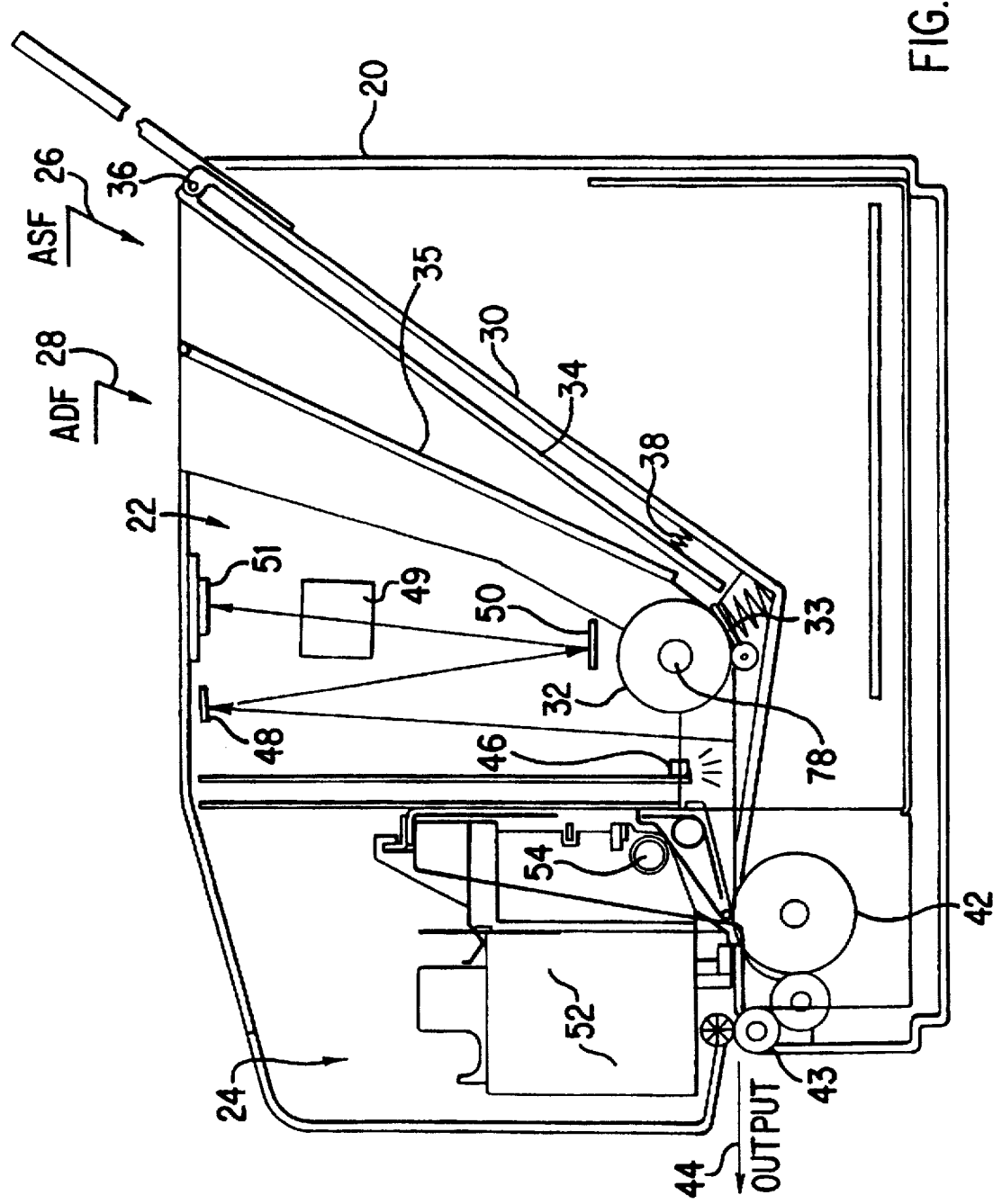
FIG. 1 is a schematic side view of a presently preferred printer/facsimile embodiment of the present invention.
Figure 2:
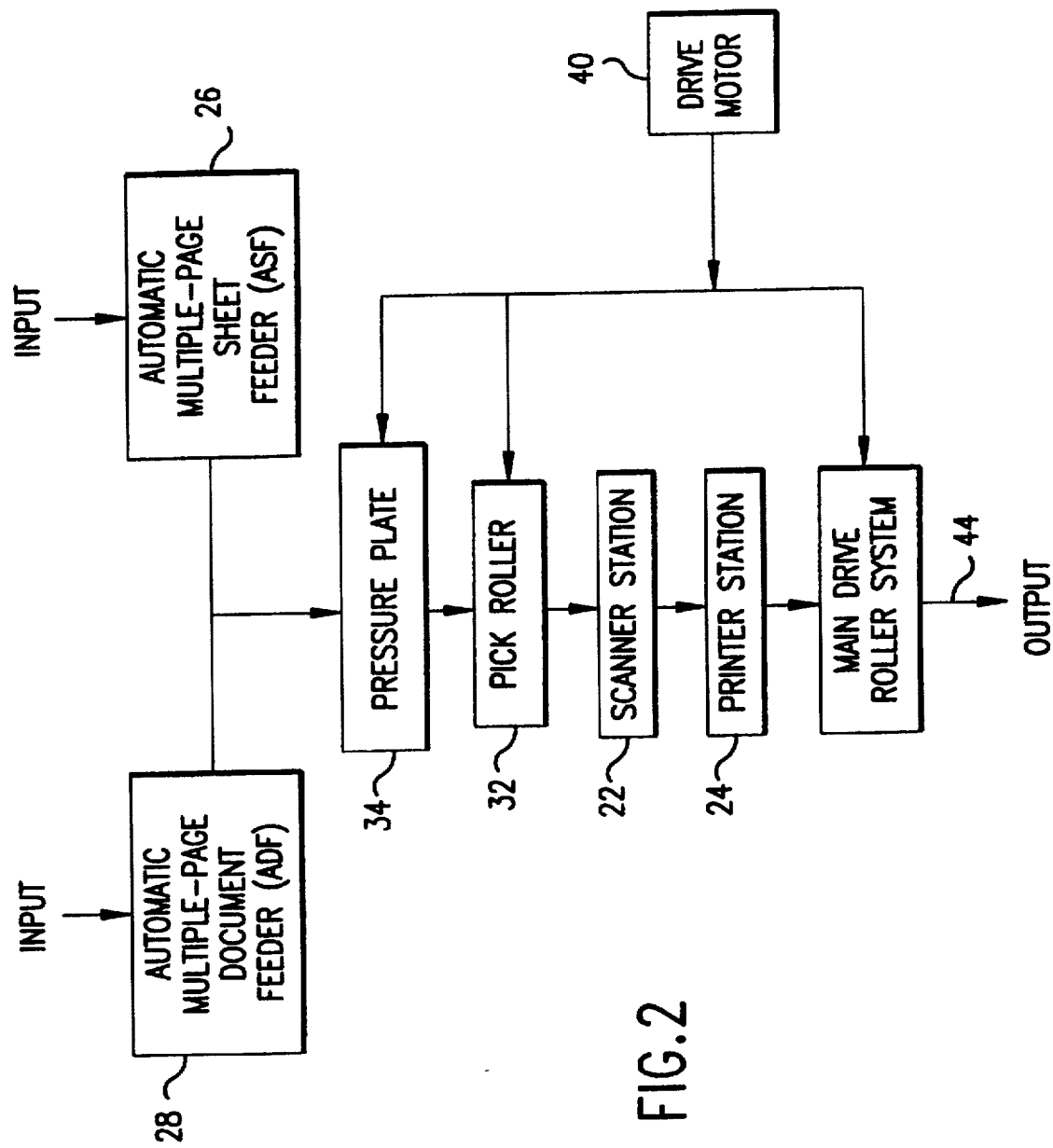
FIG. 2 is a functional block diagram of the embodiment of FIG. 1.
Figure 8:
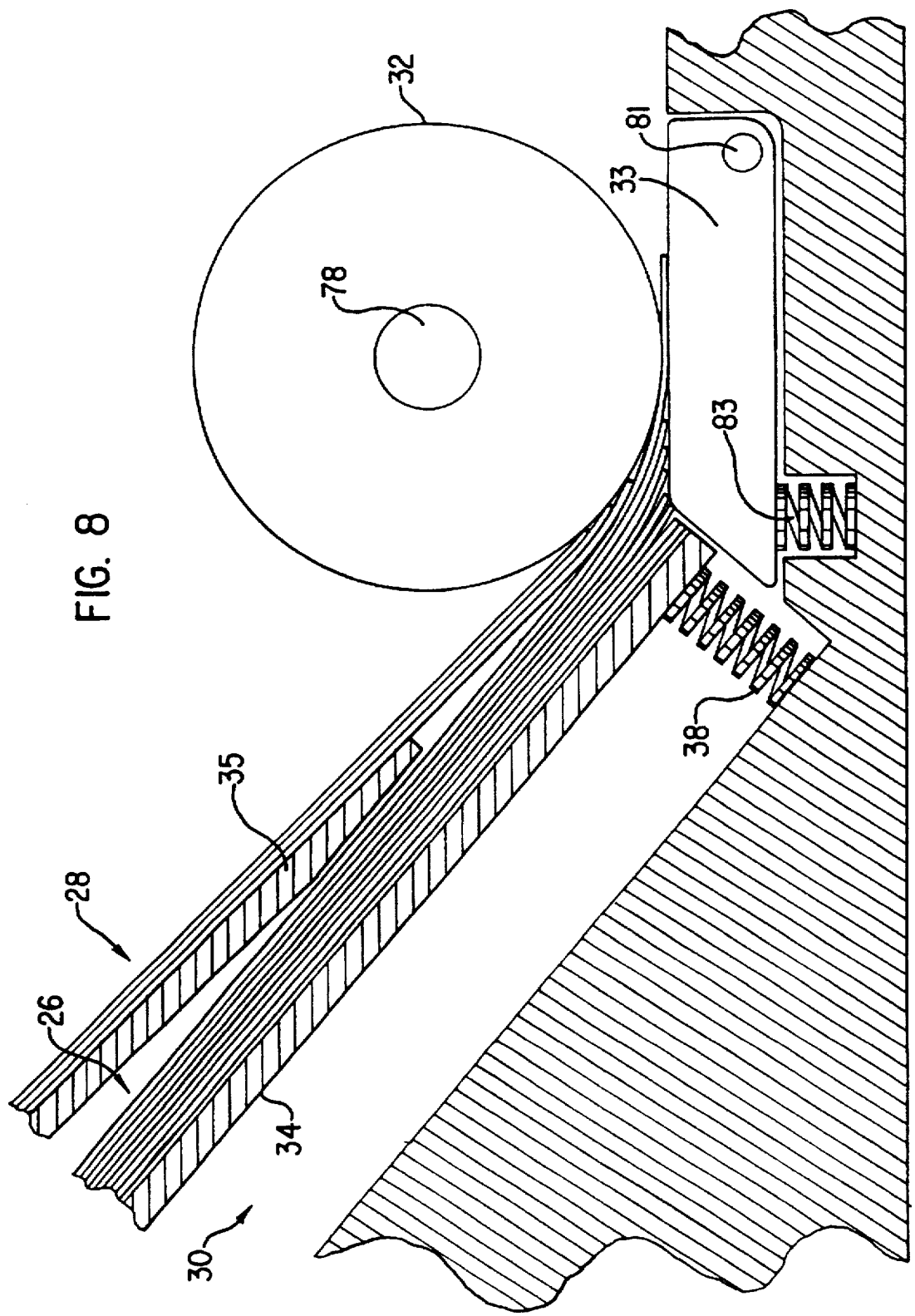
FIG. 8 is a close-up schematic showing a pick roller ready to begin a reverse rotation kicking partially picked sheet(s) backward into the ASF as a result of a document stack being inserted into the ADF.
Figure 9:
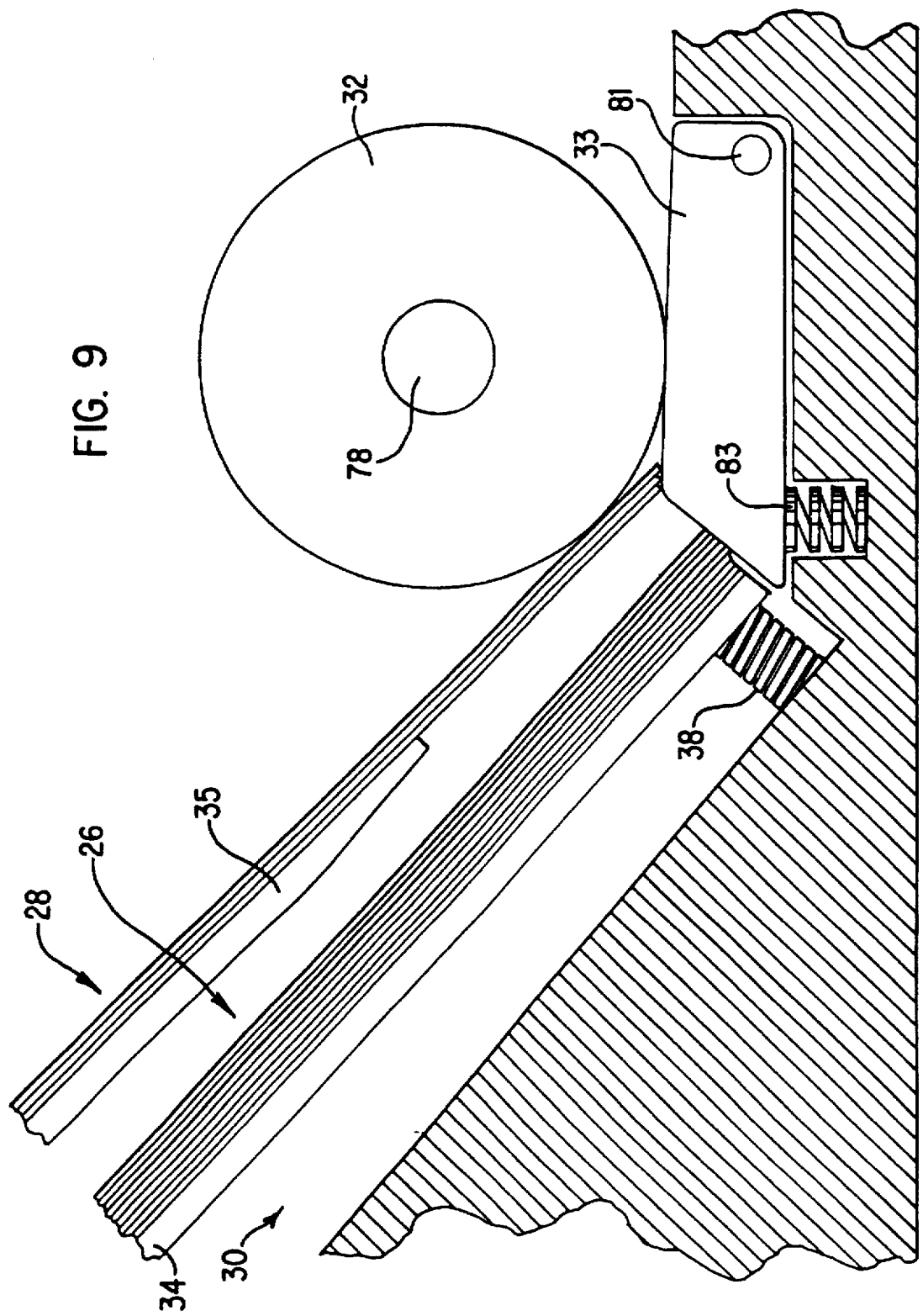
FIG. 9 is a close-up schematic showing the pressure plate in disengaged position and all of the partially picked sheets expelled from underneath the pick roller into the ASF.
Figure 10:
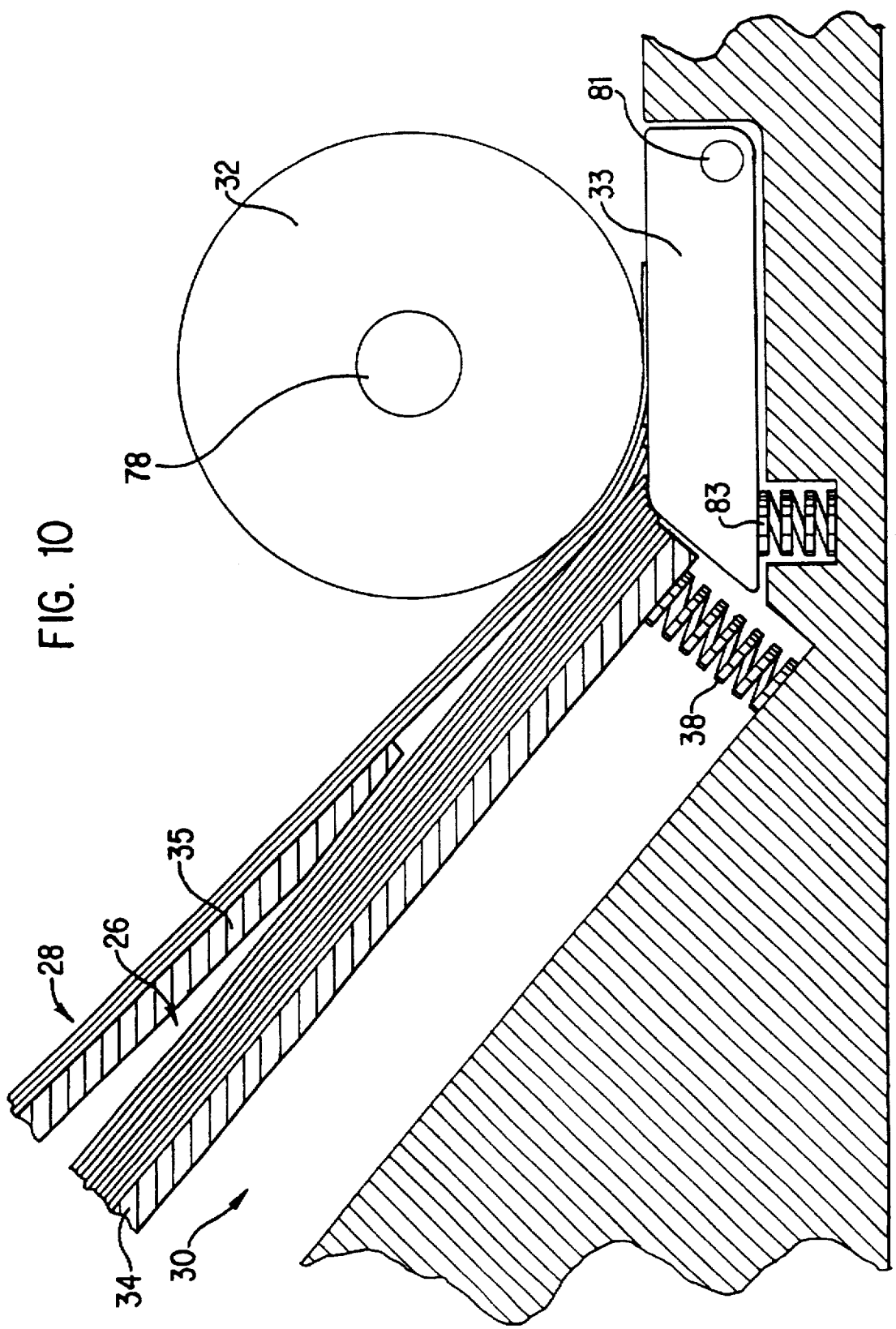
FIG. 10 is a close-up schematic showing the pressure plate returned to an engaged position with the pick roller already commencing to pick a page from the top of the stack of documents which now partially overly the stack of print sheets.

Referring more particularly to FIGS. 1-2, the multiple-function device of [the presently preferred embodiment] includes a frame 20 for housing a scanner station 22 and a printer station 24. A stack of print sheets is loadable into an automatic sheet feeder (ASF) 26, and a stack of documents having text/graphics to be scanned is loadable into an automatic document feeder (ADF) 28 which together form a common input feeder slot 30 having a pick roller 32 and a spring-loaded stripper pad 33 at the lower end. The upper portion of the input feeder slot which constitutes the ADF is separated from the ASF by a divider 35. The divider is truncated at its lower end to allow document stacks and sheets stacks to converge at the pick roller (see FIGS. 8-10). A pressure plate 34 is attached at its upper end through pivot pin 36 to the frame and is normally biased upwardly against the pick roller by springs 38. A drive motor 40 is connected through a gear mechanism to the pressure plate 34 and pick roller 32 as described in more detail hereinafter, and is also connected to a main drive roller 42 which pulls the pages through the processing stations for either scanning or printing. The printout pages as well as the scanned pages pass across an output roller 43 to be deposited in a common output area 44.

The scanner and printer stations in the drawings are for purposes of illustration only and are of conventional design, except for their unique locations along a shared path using shared mechanisms. In that regard, scanner station 22 includes a lamp 46 for illuminating a scanning zone, reflective mirrors 48, 50, a lens 49, and a CCD (charge-coupled device) photosensor 51. Printer station 24 includes inkjet cartridge 52 which rides on a slider rod 54 back and forth across a print zone.

Figure 11:
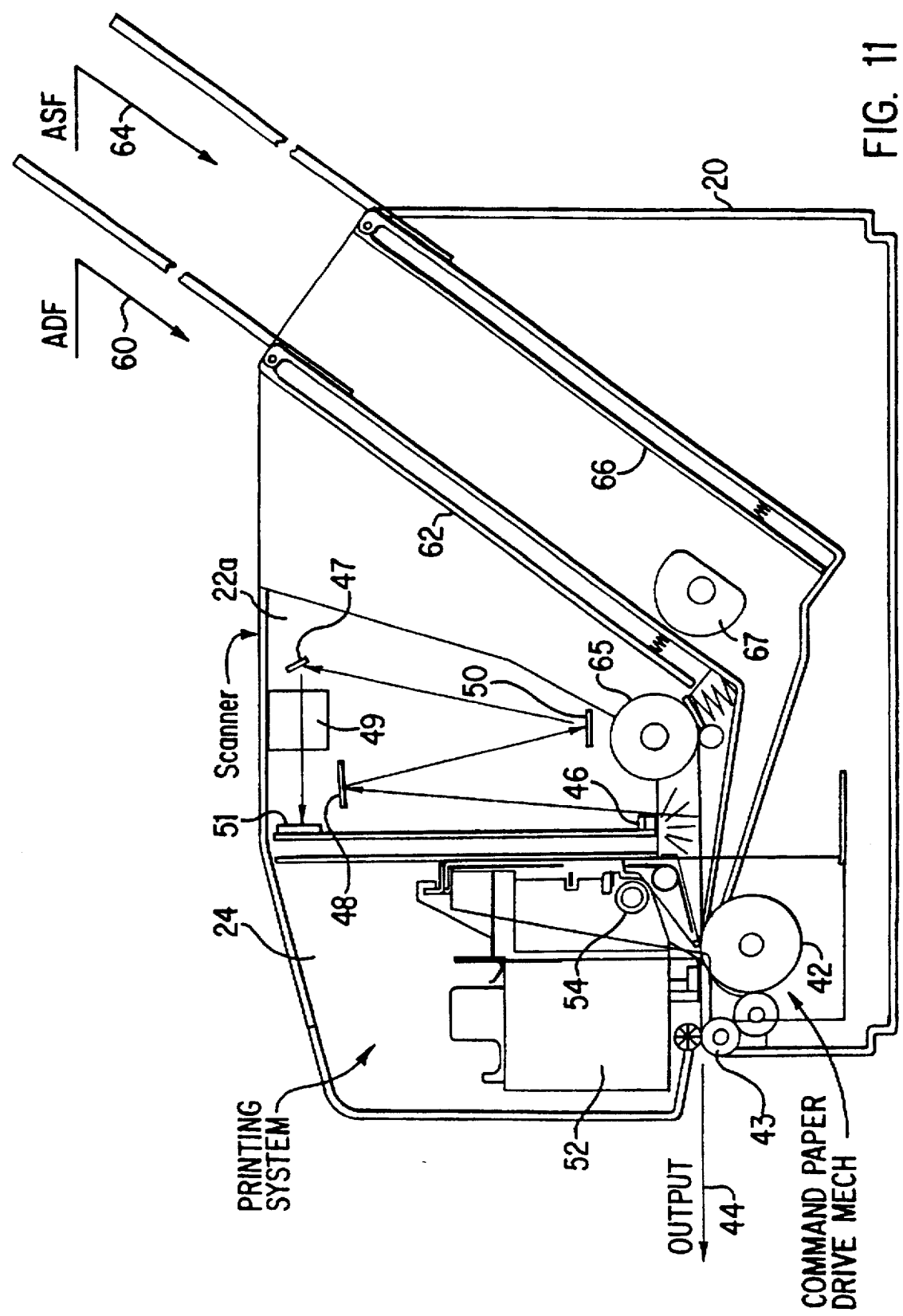
FIG. 11 is a schematic side view of an alternate printer/facsimile embodiment of the present invention.
Figure 12:
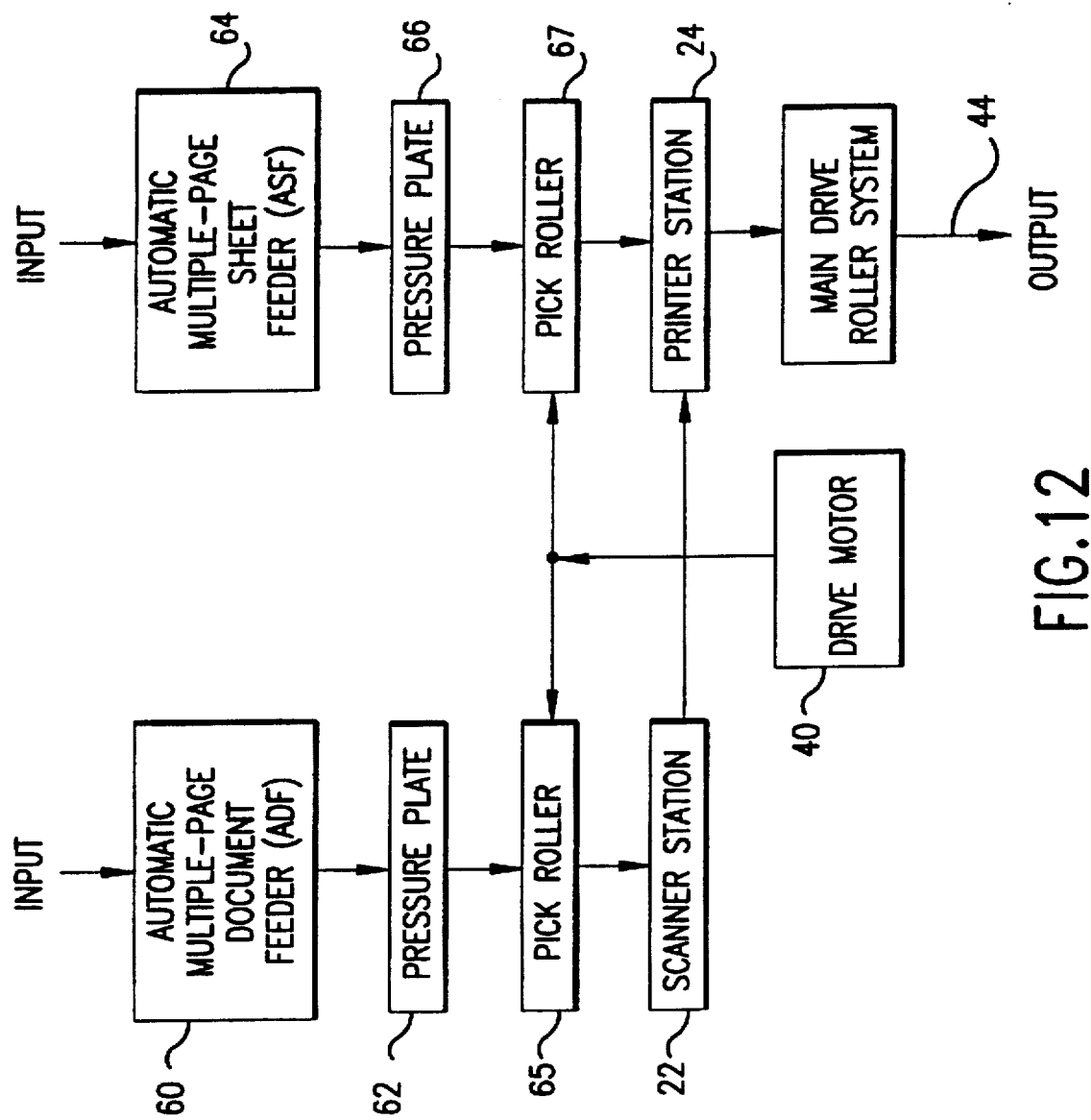
FIG. 12 is a functional block diagram of the embodiment of FIG. 11.

In the alternate embodiment of FIGS. 11-12, the common document/sheet path and shared mechanisms are similar to FIGS. 1-2 and include scanner station 22a, printer station 24, drive motor 40, main drive roller 42, output roller 43 and a shared output 44 wherein document pages proceed actively through the scanner station and passively through the printer station, and printout sheet pages bypass the scanner station and proceed actively through the printer station, both to a common output. However, ADF 60 has its own pivotally mounted spring-loaded pressure plate 62 to facilitate reliable page feeding to document pick roller 63, and ASF 64 has its own pivotally mounted spring-loaded pressure plate 66 to facilitate reliable page feeding to sheet pick roller 67, with both pick rollers 65, 67 being driven by the drive motor 40.

Figure 13:
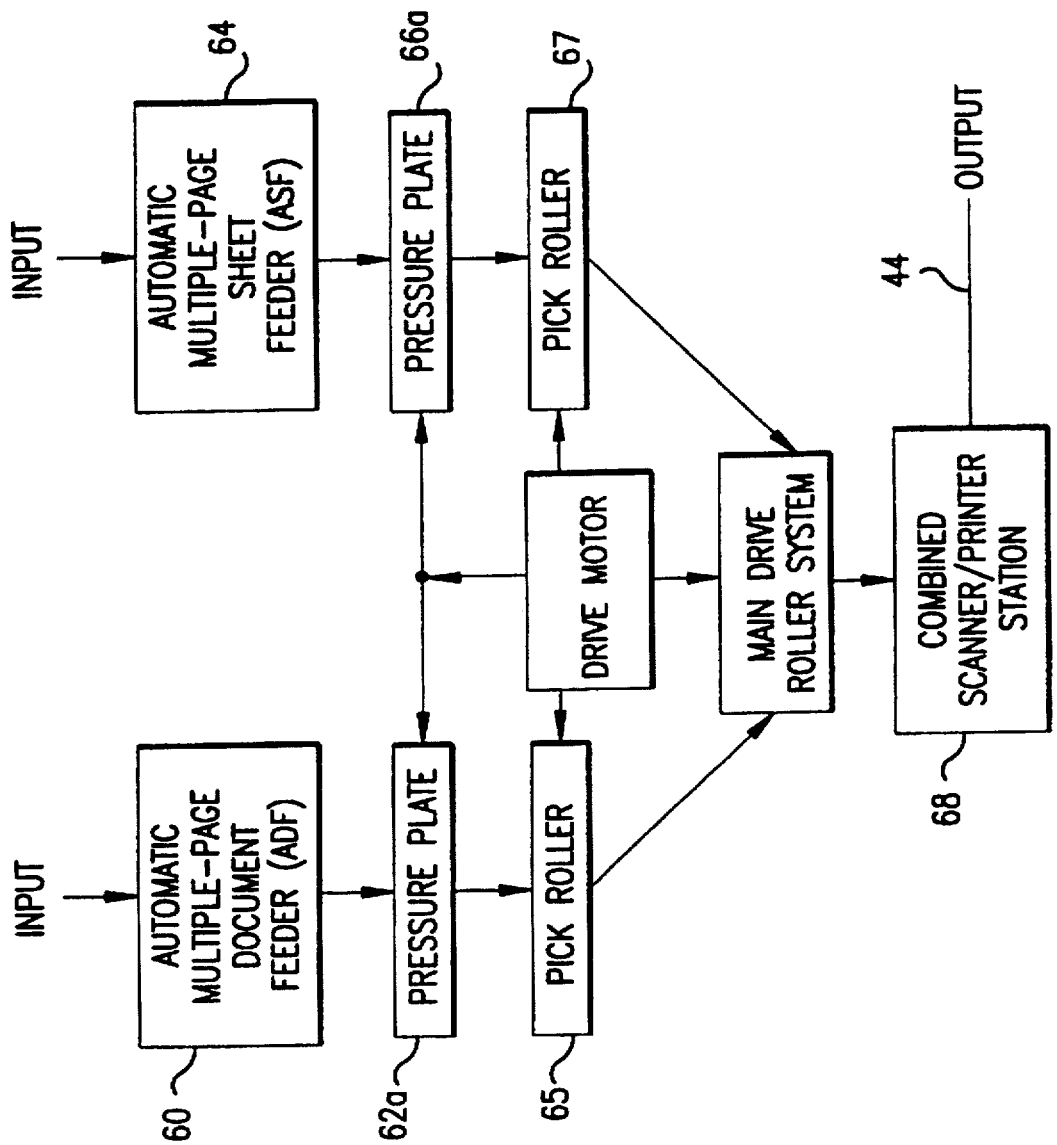
FIG. 13 is a functional block diagram of another alternate printer/facsimile embodiment of the present invention.

In another alternate embodiment of FIG. 13, the common document/sheet path and shared mechanisms are similar to FIGS. 11–12. But this alternate embodiment (FIG. 13) provides a common path through a combined scanner/printer station 68 to a common output 44, with separate pick rollers 65, 67 and separate pressure plates 62a, 66a driven by the drive motor 40 for the main drive roller system.

Referring now to FIGS. 3–6 which show further details of the preferred embodiment of FIGS. 1–2, the input feeder slot is integrated into the device so that when the unit is resting with its feet 69 on a desk top, stacks of sheets or documents can be added without having to remove any tray. Since the frame is supported by legs 71 so that the input feeder slot is angled downwardly, both of the stacks naturally settle to the bottom of the slot so that the leading edges of pages on top of the stacks will impinge against the pick roller (see FIGS. 8–10). The action of the pressure plate against both stacks assures proper separation by the spring-loaded stripper pad 33 in combination with the rotation of the pick roller 32.

The ADF includes an extender 70 mounted on the upper end of the divider 35 which pivots forwardly out of the way when pages are added or removed from the ASF. The ASF is sandwiched between the ADF and the bottom of the feeder slot and includes its own extender 72 as well as a single adjustable guide 74 for maintaining the sheet stack in proper positioning for feeding into the pick roller.

It will be understood by those skilled in the art that proper feeding/picking of pages from a large quantity stack of virginal printing paper in the ASF is a somewhat easier task than proper feeding/picking of variously sized partially bent pages of stacked documents in the ADF having text/graphics thereon. Therefore the ADF is positioned above the ASF for better picking by the pick roller and easier access for accurate and proper loading between dual adjustable guides 76. The automatic action of the pressure plate 34 as described in more detail hereinafter also helps to assure proper feeding of pages from the ASF for printing or pages from the ADF for scanning.

The pick roller 32 is mounted on a pick shaft 78 which has a pair of guide rollers 80 also mounted thereon in the commonly shared paper path, as well as a double-pin delay coupler 81 mounted on the shaft end outside the frame. The guide rollers 80 and matching pinch rollers 82 help to hold the pages in proper position as they move past the pick roller to the scanning and printing stations.

Figure 3:
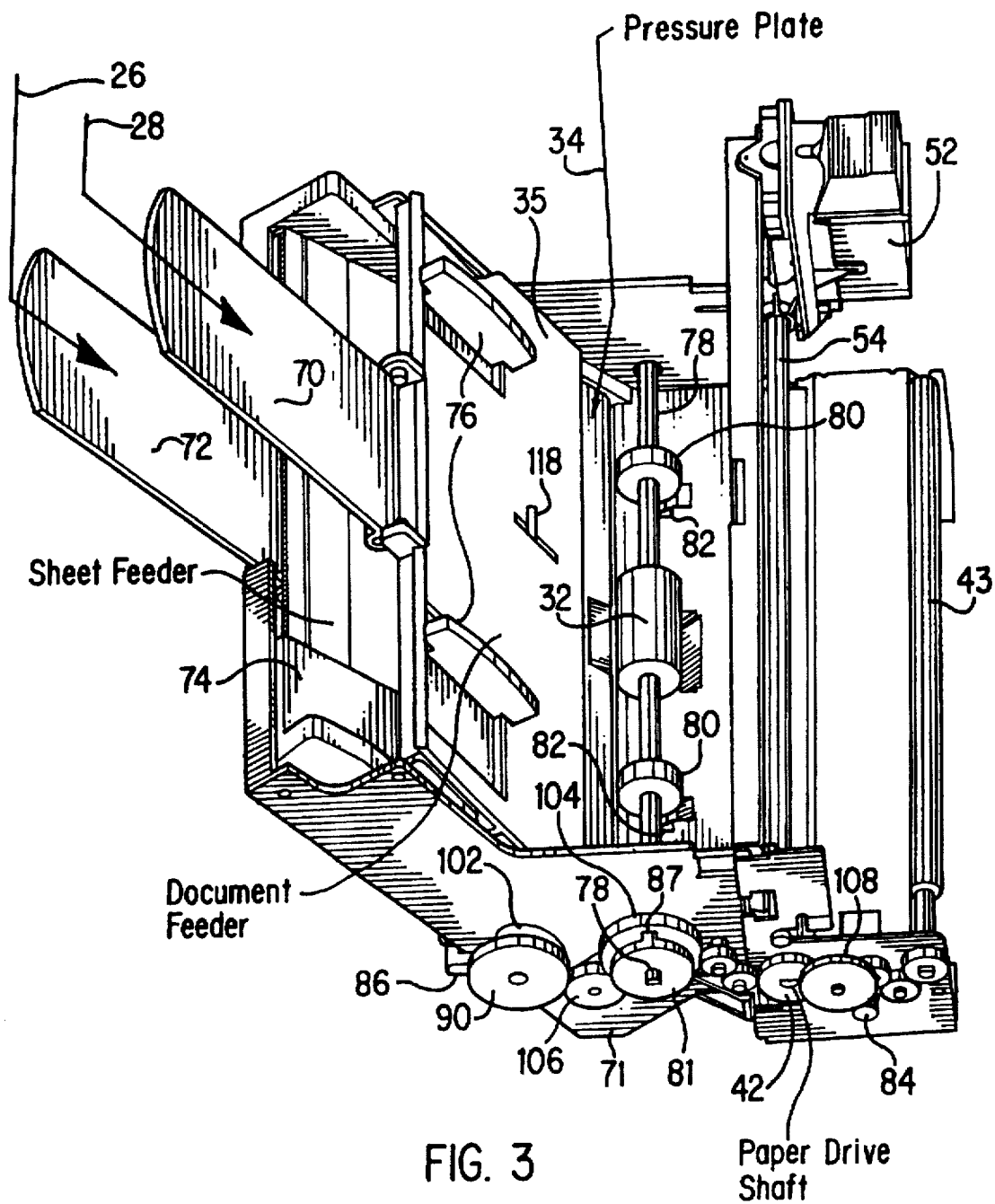
FIG. 3 is an isometric view looking down into an implementation of the embodiment of FIG. 1.
Figure 4:
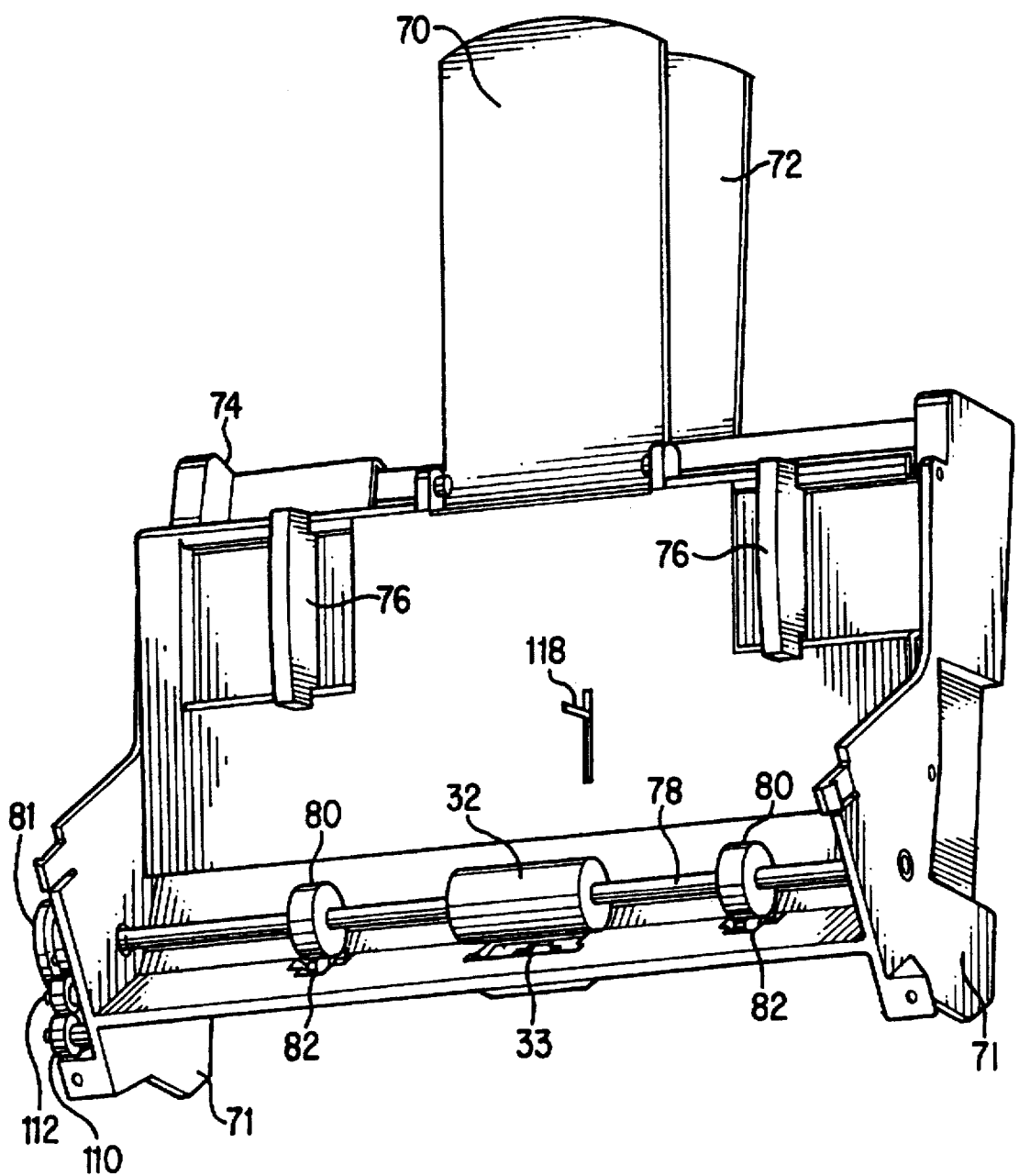
FIG. 4 is a fragmentary isometric view showing the input feeder slots and pick roller portion of FIG. 3.
Figure 5:
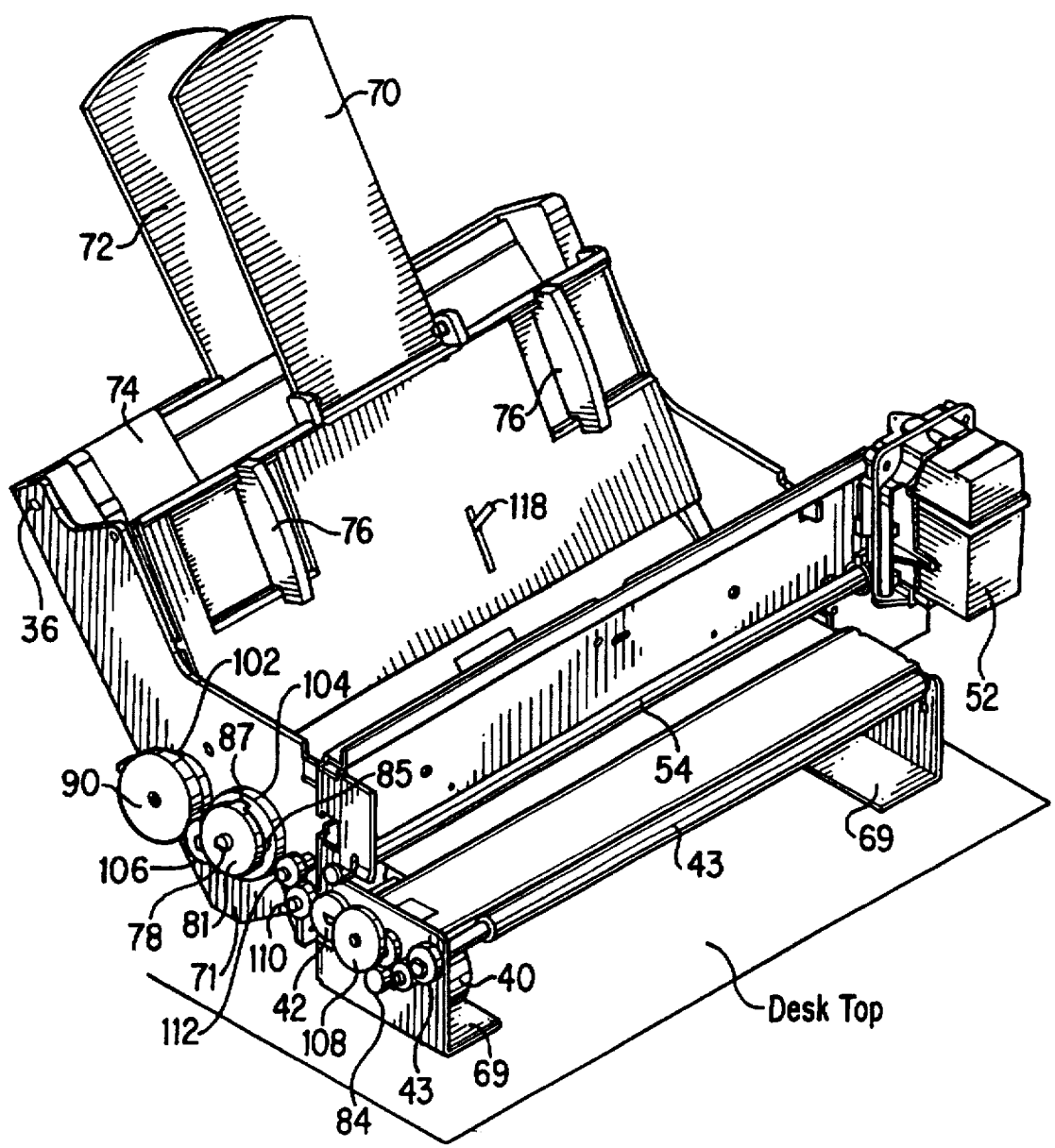
FIG. 5 is a front isometric view of FIG. 3.
Figure 6:
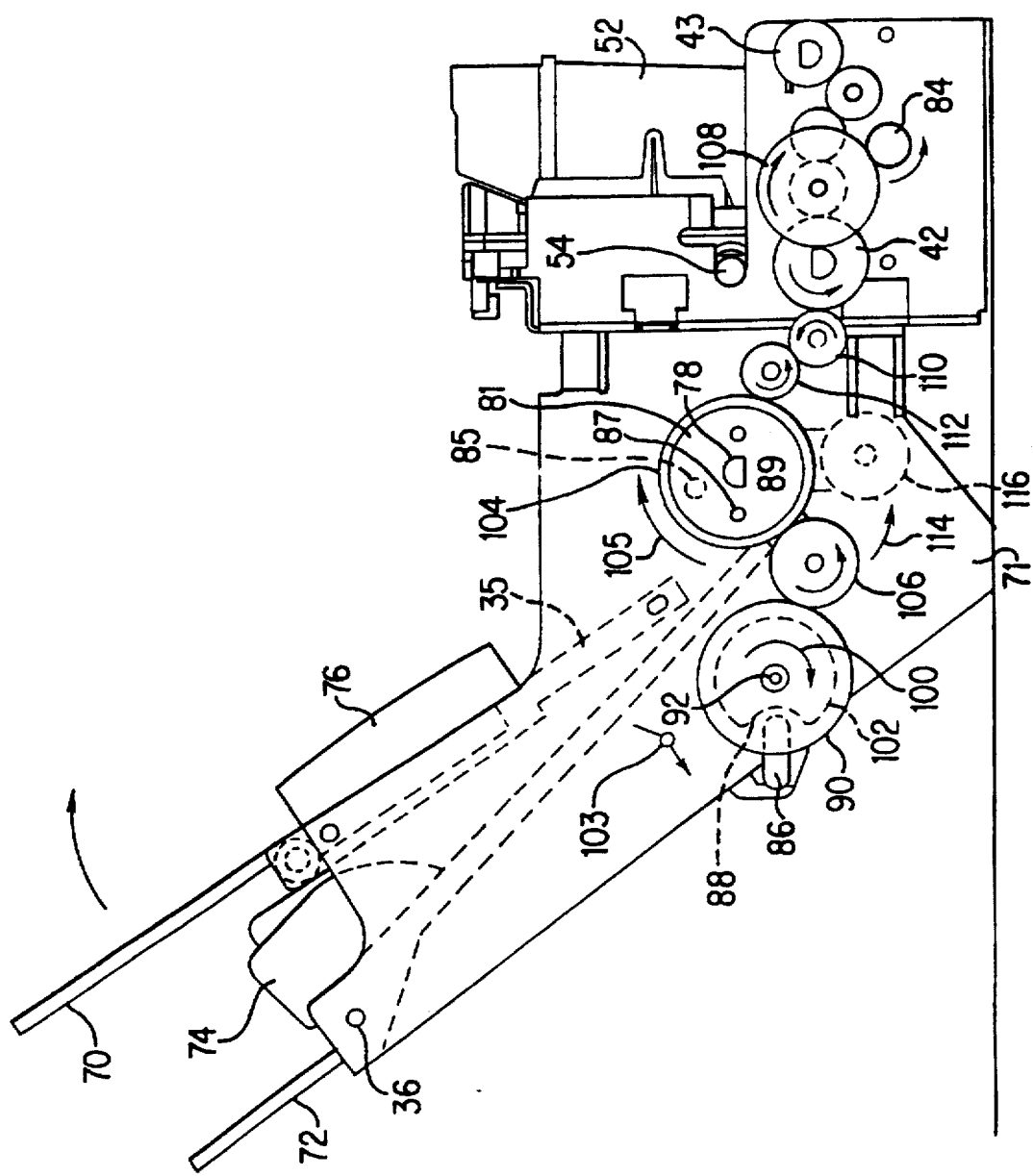
FIG. 6 is a side view of FIG. 3.
Figure 7:
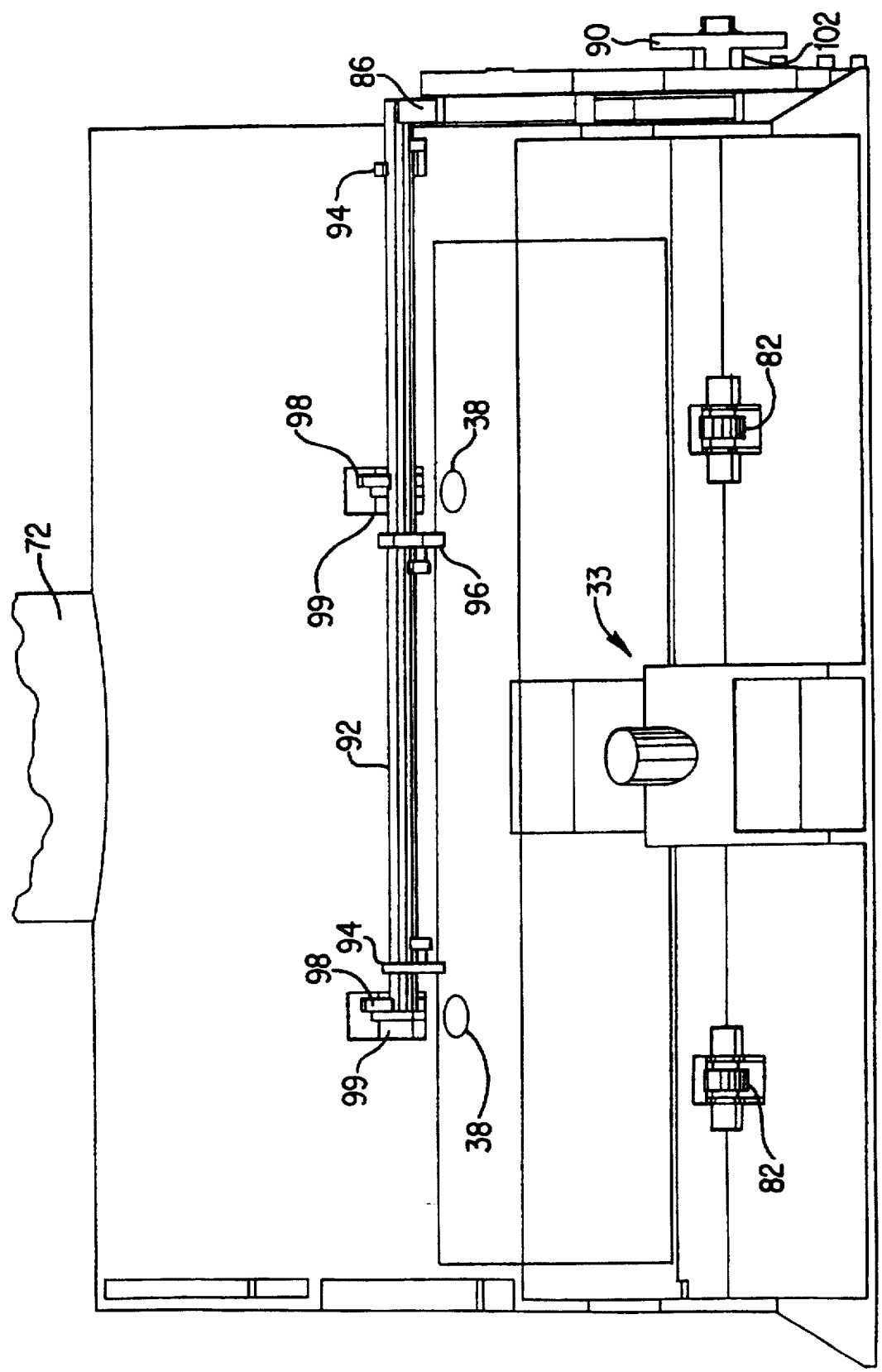
FIG. 7 is a fragmentary back view looking up at the feeder slots and pick roller portion of FIG. 4.

A unique gear mechanism is shown in FIGS. 3 and 6–7 for automatically moving the pressure plate to and fro between a disengaged position "open" position and an engaged "closed" position. The disengaged open position allows access to the stacks for removal, replenishment, or replacement of pages as well as for realignment Of the stacks between one or more page picking events if that is deemed to be desirable and necessary to avoid mis-feeds. More importantly from a multiple-function point of view (see FIGS. 8–10), the disengaged open position allows new pages of documents to be placed in the ADF with their leading edges resting on top of the sheet stack in the ASF, thereby preparing for a scanning operation to commence.

The engaged closed position holds the sheet stack in aligned position together as a unit if there are not any documents in the ADF. This helps to prevent more than one page from being accidently picked. The engaged closed position holds the document stack in aligned position together as a unit if there are not any sheets in the ASF. If there is already a stack of sheets in the ASF and some additional document pages have been added to the ADF, then the engaged closed position holds both the document stack and the underlying sheet stack in aligned position together as a composite stack insofar as their leading edges are concerned.

FIG. 6 shows the gear mechanism in a "start disengagement" position, with motor drive gear 84 moving in reverse direction to cause main drive roller 42 to also go in reverse. Coupling pin 85 on linkage gear 104 is partway between forward direction coupling pin 87 and rearward direction coupling pin 89 on delay coupler 81. This assures that commencing the reverse driving of the pick roller to expel partially picked pages does not occur until after the pressure plate has been moved into disengagement position.

Cam follower 86 is resting in a notch on cam 88 which is rigidly mounted for turning with pressure plate gear 90. So long as cam follower 86 remains in the notch, the pressure plate remains in closed engagement position. The connection between cam follower 86 and the pressure plate is best shown in FIG. 7. The cam follower 86 is mounted on the end of a pivot rod 92 which is mounted for pivotal rotation by a pair of brackets 94 and a counter-bracket 96. A pair of fingers 98 are also mounted on pivot rod 92 and interconnect with matching slots 99 so that when the pressure plate gear 90 is rotated in direction 100, the cam follower is forced to pivot upwardly into "disengagement position" and ride along the larger diameter surface 102. This makes the entire pivot rod 92 rotate and causes the fingers 90 to pivot the pressure plate in direction 103 into a completely retracted position of disengagement in a direction away from the pick roller 32. When the pressure plate 90 has made a complete rotation, the cam follower rides back down into the notch, thereby allowing the pressure plate to return to an "engagement position".

A linkage gear 104 is slidably mounted on the pick shaft 78 to couple the drive motor 40 to the pressure plate gear 90, and also to couple the drive motor 40 through the double-pin delay coupler 81 to the pick roller. When the motor drive gear 84 is in reverse, the linkage gear rotates in direction 105 to move its attached transfer gear 106 into link position with the pressure plate gear 86. Thus the coupling from drive motor 40 to the pressure plate gear 90 is through double-wheel gear 108, main drive gear 42, spur gears 110, 112, linkage gear 104, and transfer gear 106. Decoupling occurs when the motor drive gear 84 changes back to forward, since this changes the rotation direction of linkage gear 104 and moves transfer gear 106 in the direction 114 to a non-link position 116. The foregoing gear/cam mechanism provides for automatic movement of the pressure plate between a position of engagement of the stacks with the pick roller and a position of dis-engagement. This necessarily occurs after a page being processed at the scanning station or the printing station has passed by the main drive roller 42 and the output roller 43 to the common output area 44.

The initiation of the dis-engagement can be programmed to occur at predetermined times such as before every picking step, or whenever a mis-feed occurs, or the like. Also, when a document page is placed in the ADF, it pushes down sensor 118 to activate the aforementioned dis-engagement sequence of steps.

As best shown in FIG. 6, the delayed contact of the pin 85 on linkage gear 104 with double-pin delay coupler 81 causes the reversing of the pick roller expelling any pages from a previous picking step to occur after the pressure plate has moved to a position of dis-engagement.

As best shown in FIGS. 6, the gearing mechanism is designed to automatically provide a delay between the picking of successive pages from the sheet stack or document stack. In that regard, the gearing ratios provide for output roller 43 to rotate faster than main drive roller 42 which rotates faster than pick roller 32. The speed differential between the output roller 43 and the main drive roller 42 keeps a page in tension as it passed through the printing station, the scanning station, or the combined printing/scanning station.

The linkage gear 104 has its single pin 85 which engages one or the other of the two pins 87, 89 on the delay coupler 81 (depending on the direction of the main drive) to drive the pick roller forwardly or rearwardly with a partial revolution delay for driving the pick roller when a directional change occurs. This relationship between the linkage gear 104 and the delay coupler 81, when combined with the speed differential between the pick roller 32 and the main drive roller 42, provides for the pin on the linkage gear 104 to walk away from engagement of the pin on the delay coupler so long as a page is in driving engagement with both the pick roller and the main drive roller. In other words, during that double driving period, the pick roller is slaved to the paper and rotates faster than the linkage gear to cause the aforesaid "walk away".

When the trailing edge of the page finally leaves the pick roller, the pick roller shaft and the delay coupler mounted thereon stop, and the time it takes for the pin on the linkage gear to rotate into engagement with the pin on the delay coupler is the "delay time" which occurs between the picking of successive pages from the stack.

Thus, the aforementioned features of the present invention provide for automated operation of a printing station, scanning station or the like from a single drive motor through a gear mechanism which provides spaced-apart picking of successive pages from an input feed stack. These aforementioned features also provide for the shared use of a paper path and mechanisms which are involved along the path by a multiple-function device which employs operations such as printing, scanning and the like in the same machine.

Figure 14:
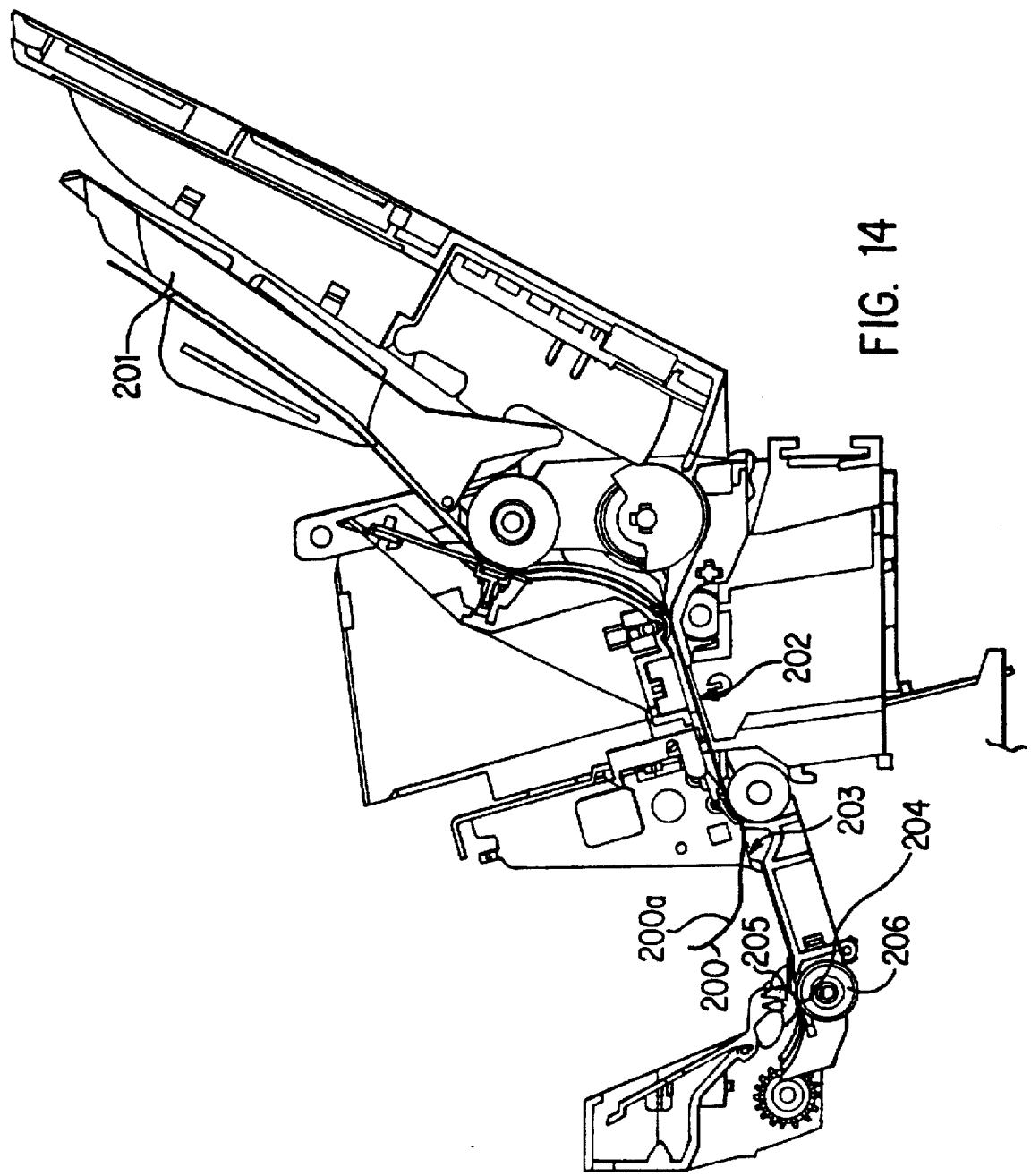
FIG. 14 is a more detailed schematic side view of the common paper path of the invention illustrating the common path with a curled document positioned immediately prior to an incipient paper jam at the output roller nip.

FIG. 14 illustrates the curling of a document 200 after the document has been fed from a document feeder 201 past a scanning station 202, including a scanner 202a underneath the common paper and document path, where it has been scanned, passively over a printing station 203 (sans print cartridge which has slid away from the print zone) which document was destined to be conducted into a nip 204 between output rollers 205 and 206. As a curled document exits the scan station and enters the print region it is free to return to its natural curled state. Due to the curling of the document at 200a, the document is in an incipient position to cause a paper jam before reaching the nip 204. The position of the scanner underneath the common path (unlike the FIGS. 1 and 11 embodiment showing the scanner above the common path) allows the use of the single output stacking tray with the non-printed sides of the printed media in face-to-face abutment in the output tray.

Figure 15:
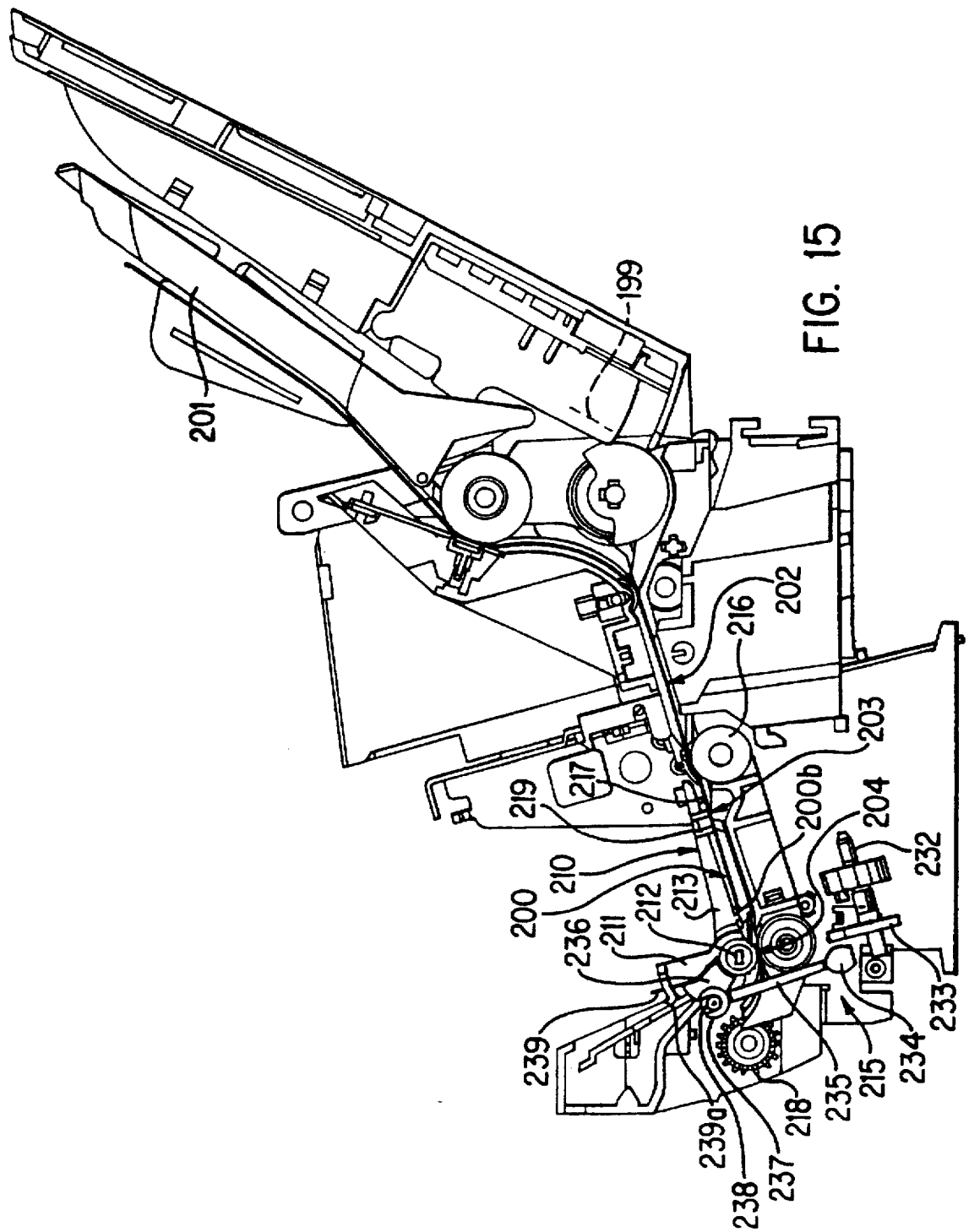
FIG. 15 is a schematic side view of the common paper path showing a jam-preventing document guide in a lowered position.

FIG. 15 shows the addition of a document guide 210 which in a lowered position deflects an incoming document 200 by being forced by roller 216 under the deflector guide. The leading edge of a curled or damaged or deformed document (or the uncurled leading edge if the document is flat) are deflected by a document guide essentially smoothed-faced underside surface 217 and thus guide the leading edge 200b of the document into the nip 204. A tab 219 depends from near a distal end of guide 210 and rides on an edge of the print platen 203a (FIG. 16) of the printing station and functions as a down stop of the document guide 210. The document guide has a first long portion 213 which in a scanning mode position is parallel to the platen of the printing station and in position to guide a document (curled or uncurled) into the nip 204, an integral short portion 211 and a pivot 212. Arrow 220 in FIG. 17 denotes the document feed direction. The documents are constrained at their top surface by the underside 217 of the document guide and at their bottom surface by the print station platen.

Sheets which are to be printed on are clean virgin sheets without curl and thus there is no need to guide or constrain the print sheets to the common output nip. Sensors (not shown) in the document tray 201 and in the sheet feed path 199 indicate if a document is to be scanned or a sheet is to be printed. Rollers 218 are provided as part of a wet paper stacker (not shown) which functions to force the edges of the printed-on sheets to go up causing a sheet stiffness so that the sheet more accurately drops into a bin allowing for more dry time of the previous sheet.

Figure 16:
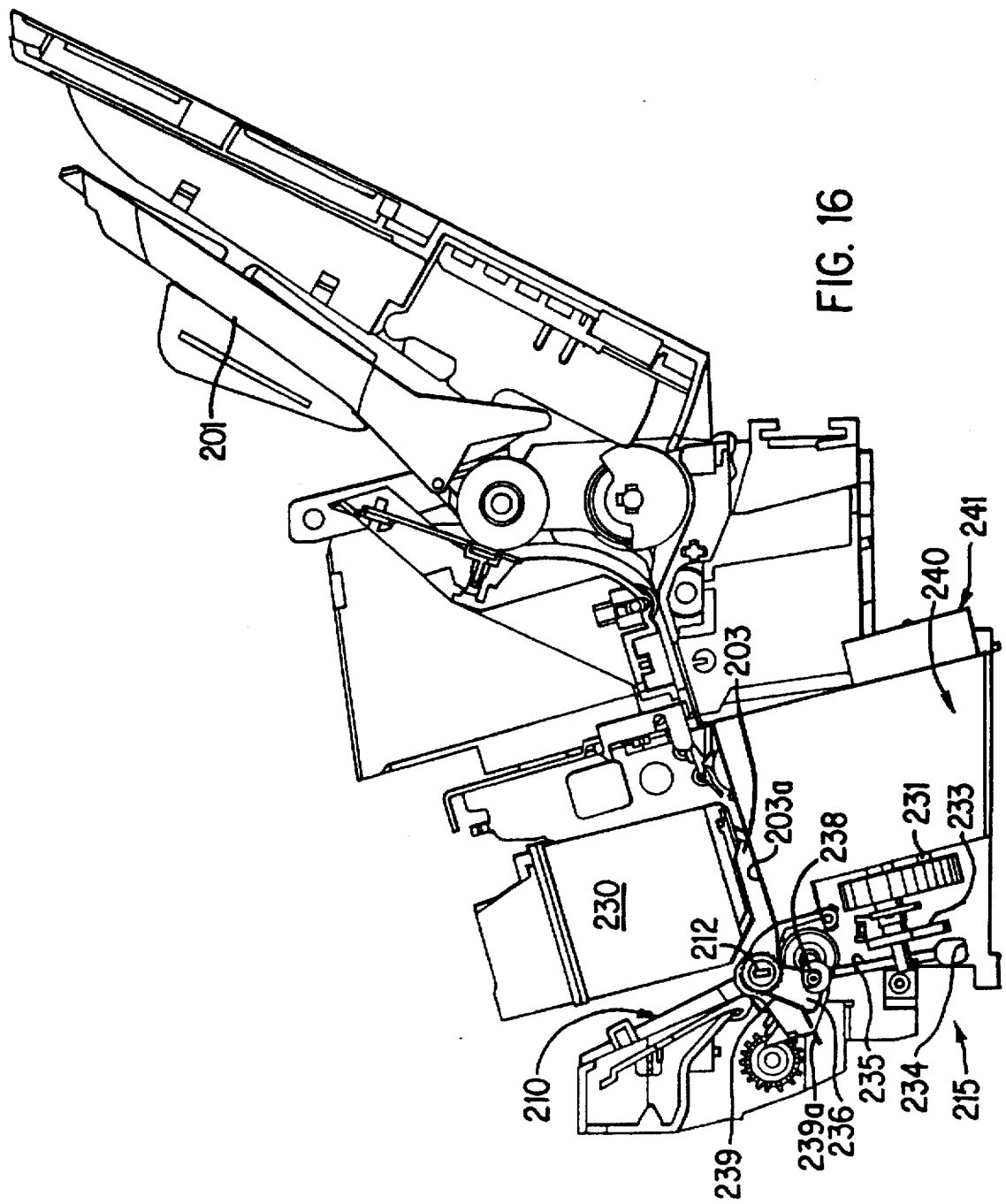
FIG. 16 is a schematic side view of the common paper path showing the document guide in a raised position allowing the print cartridge to be horizontally moved into a printing mode position.
Figure 17:
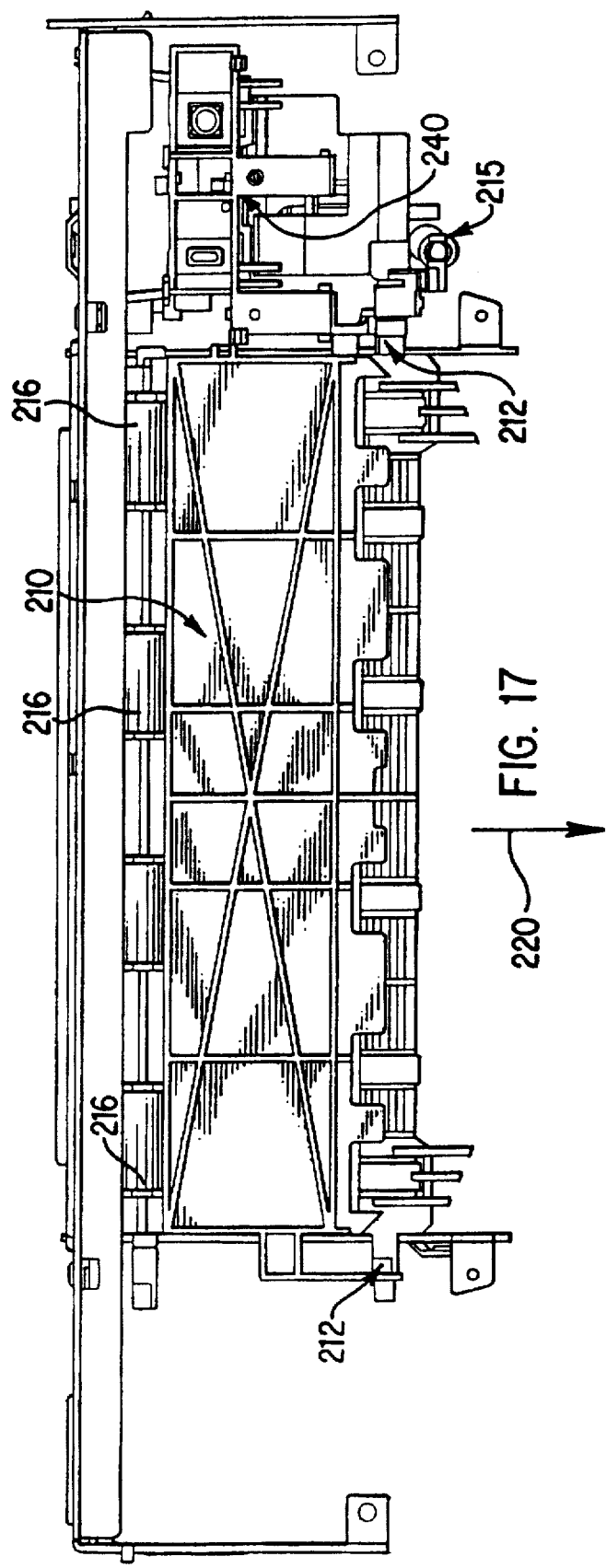
FIG. 17 is a top view of the printer station with the document guide in a scanning mode position.

As seen in FIGS. 15 and 16 a mechanism is provided to rotate and lower the document guide clockwise about 100° to 110° for a scanning mode of operation after a printing mode of operation has been completed, with the print cartridge slid away from the printing station or zone. Thereafter, a coil spring 239 having an end 239a attached to a pivot plate 236 and coiled around the pivot, which has been spring loaded by the rotary movement, returns, by the spring bias, the document guide 210 back to the raised position shown in FIG. 15. This is required to allow for the print cartridge 230 (FIG. 16) to be moved into close proximity to the paper sheet. The document guide is rotatively movable about the pivot 212 which provides a center of rotation. Actuation is provided by a linkage 215 between the document guide and the print cartridge capping and wiping system 240 (FIGS. 16 and 17). The invention makes use of a dwell state in the capping function where the capping and wiping system motor 241 continues to rotate after the print cartridge has been capped. This extra motion is connected to gear shaft 231 (FIG. 16) to the linkage 215 and is just long enough to raise the document guide when rotating the capping system motor in one direction or lower it when rotating in the other direction.

The linkage 215 includes a drive shaft 232 which rotates a lever arm 233 containing an offset ball crank 234 from the position shown in FIG. 16 to the position shown in FIG. 15 by moving a push rod 235 having a fork end 237 pushing on a fixed pin 238 on a pivot plate 236, which end rotates the pivot plate 236 fixedly connected to the document guide 210 clockwise to pivot the document guide counterclockwise (looking at FIG. 16) to its raised position in FIG. 16, permitting the print cartridge 250 (FIG. 16) to be moved laterally into the print station 203.

Figure 18:
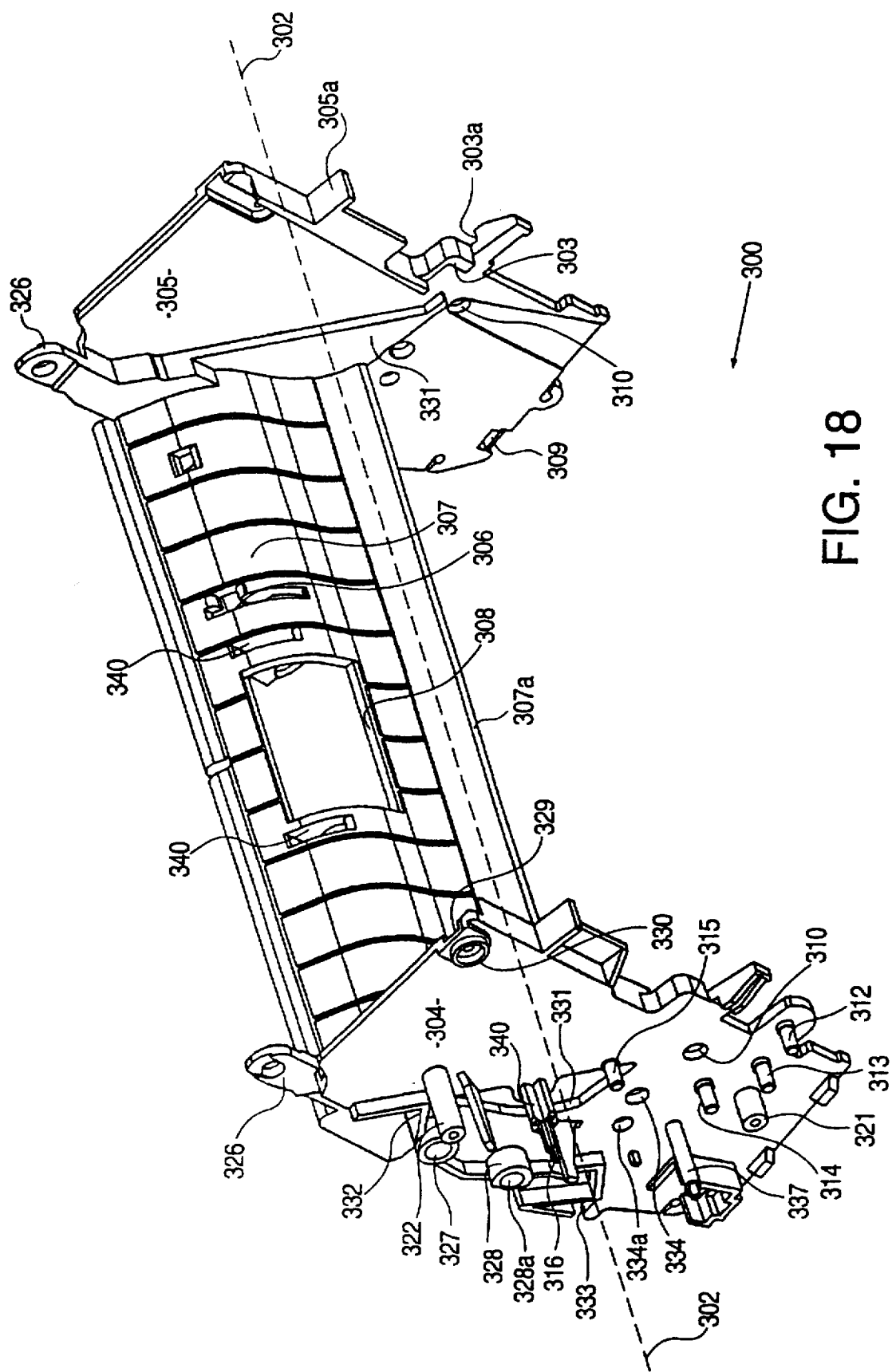
FIG. 18 is a perspective view of the common chassis per se of the invention.
Figure 19:
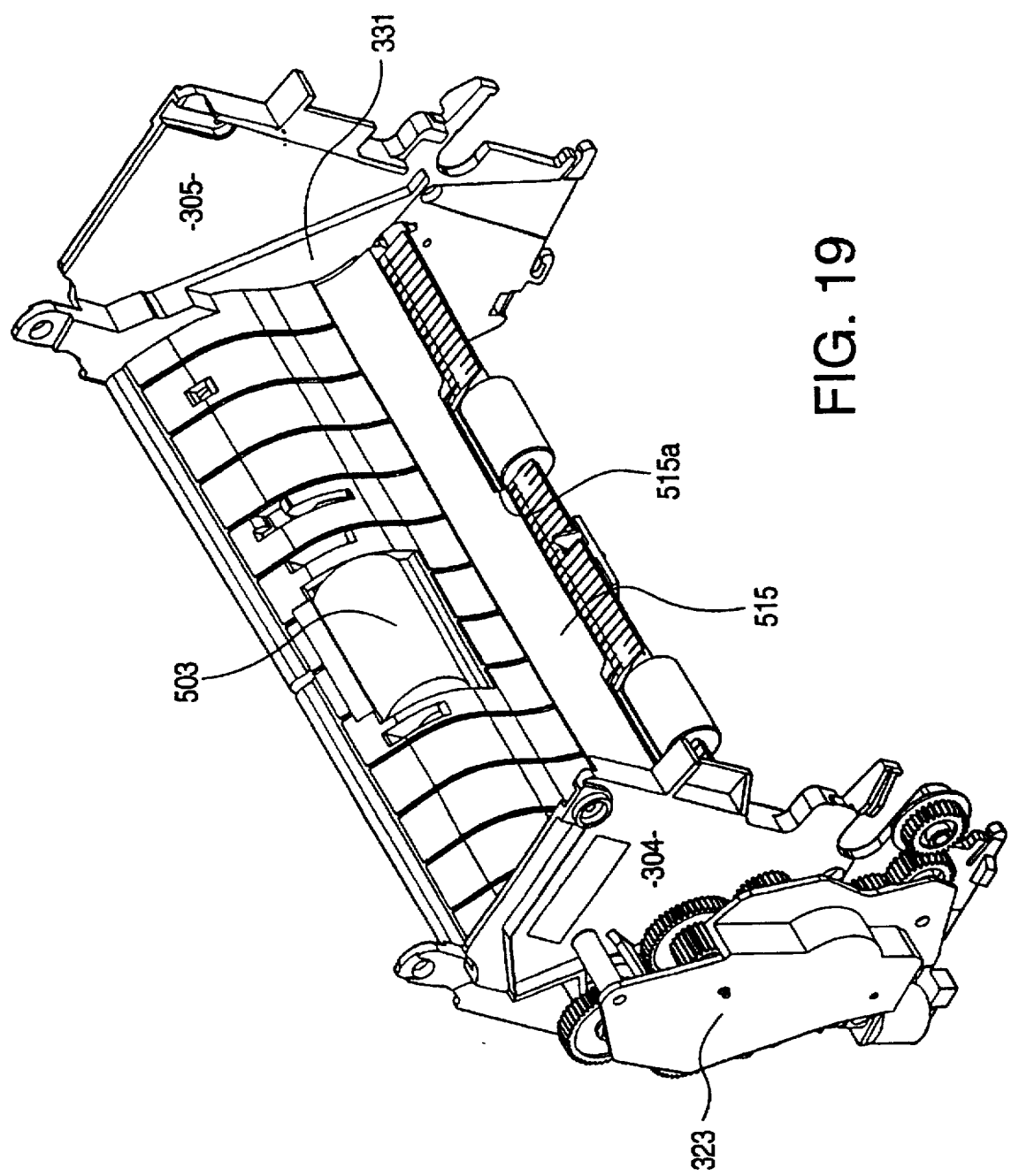
FIG. 19 is a perspective view of the common chassis with the mounted elements of the overall assembly.
Figure 20:
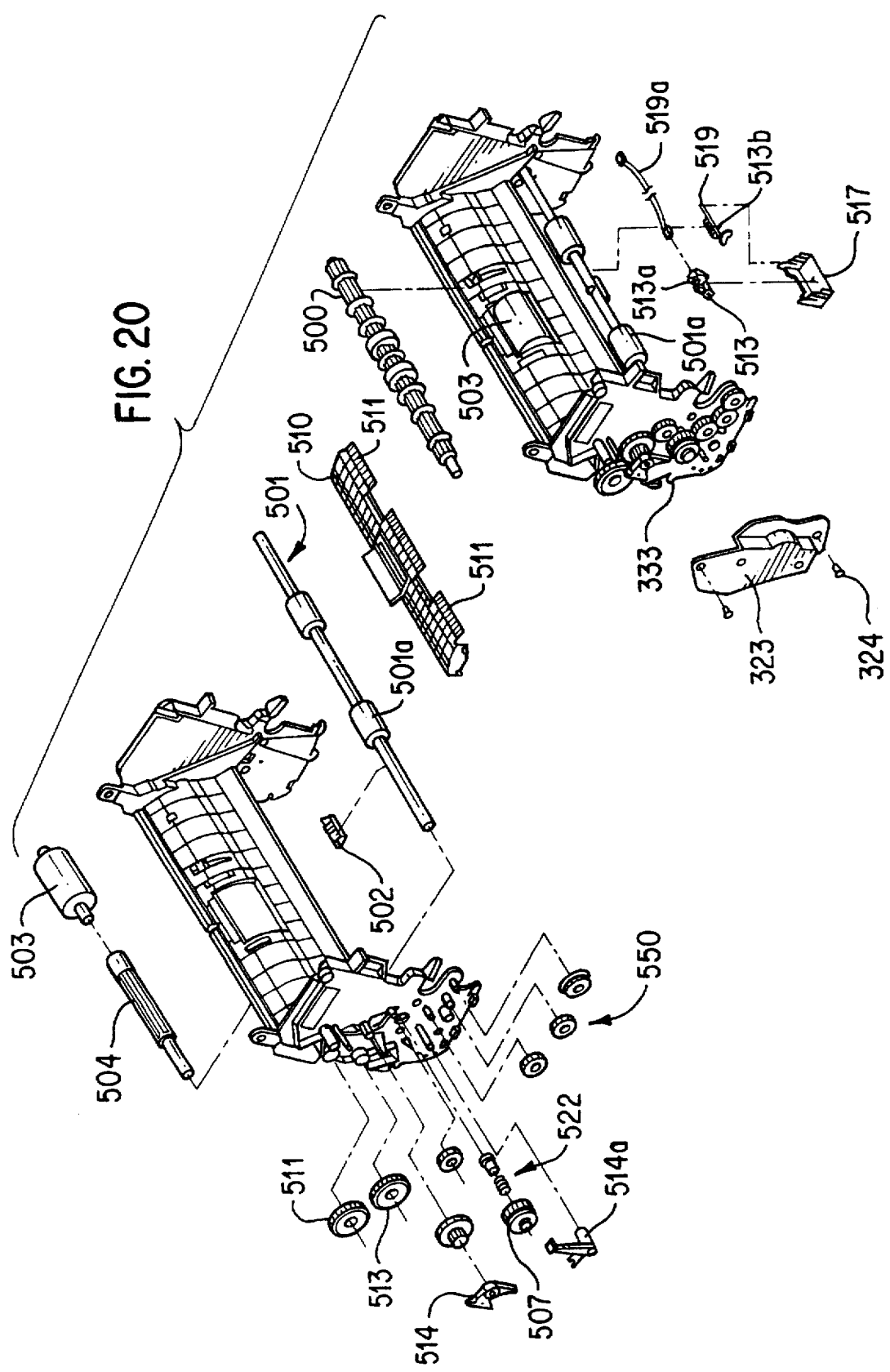
FIG. 20 is an exploded view thereof.

FIG. 18 illustrates a common media chassis 300 with spaced bosses 330 extending parallel to the longitudinal axis 302 of the chassis, for supporting end covers (not shown) of a printer casing (also not shown). Hooks 303a are a snap-in feature that holds the media chassis assembly to a sheet metal chassis (not shown) in front of the overall printer. The undersides of ledges 303 support the ADF (FIG. 3), the ADF being slidingly inserted in the chassis between the chassis end walls 304, 305. Ledges 305a are deflection members which mate with matching holes in the sheet metal chassis which do not touch the holes except when the printer is accidently dropped and the edges 305a then give additional support to absorb the impact. A chassis aperture 306 provides a viewing access for a sensor, such as a slot-interruption optical sensor, available as Model No. GPIA75E from Sharp Co. of Japan, for sensing the presence of paper at surface 307 of the chassis. A rectangular aperture 308 permits access of a paper pick 503 (FIGS. 19–20) to move a paper sheet or document into the feed mechanism. Slots 309 and apertures 310 mount and support the scanner station chassis which is positioned underneath the common path. A gear train 550 (FIG. 21) is supported on an outside surface of wall 304 on gear stub shafts 312, 313, 314, 315 and 316. Slot 333a supports the ADF and ASF trays (FIG. 3). A pen door having end pins (not shown) is supported by apertured tabs 326 extending from the top rear corners of the media chassis 300. Slots 309 and apertures 310 function as attached points for snap-in connection of scanner 202a. Bosses 321 and 322 contain an aperture for mounting a plastic gear housing plate 323 (FIG. 20) by screws 324.

Figure 21:
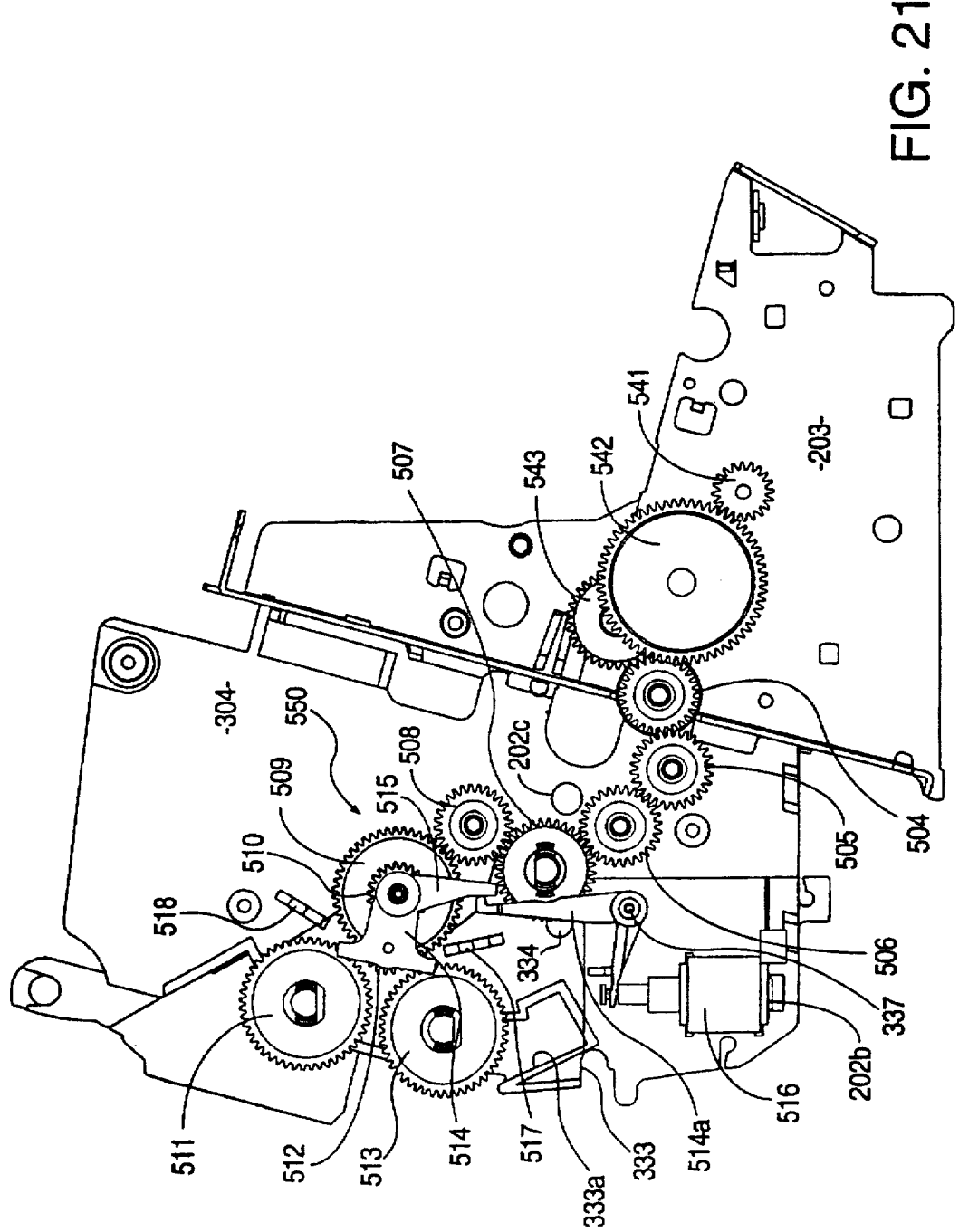
FIG. 21 is a side view of the gear train of the common media chassis showing the connection of the chassis to a print station chassis.

Plate 323 also functions to receive the outer ends of the gear shafts of gears 511, 510, 508, 507, idler 506 and idler 504 (going from top left to lower right of the media chassis in FIG. 21). Integral stubs 327 and 328 function as bearing surfaces for the gear shafts of gears 511 and 513, respectively. Slots 329 are recesses to hide a screw head from the ADF as the ADF is inserted into the chassis. Bosses (screw holes) 330 function to support the end covers. A countersink 331 is contained in the walls 304, 305 to maintain the same wall thickness throughout to provide a guiding ramp for the ADF so that it will easily and reliably assemble into its reference feature ledges 303. One portion contains an aperture 328a for the gear shaft of gear 513 which shaft extends to be the shaft of the rotatable ASF pick roller 500 (FIG. 20) assembled across walls 304, 305. A prescan drive element 501 (FIG. 20), with a flag-edge sensor 502 for sensing paper edges, is rotatively mounted to the shaft extending from gear 507 and also extends between walls 304, 305. An ADF pick roller 503 mounted to gear 511 by shaft 504, which extends from wall 304 through a pair of pinions 340 extending from the rear of surface 307, accesses a document through aperture 308 in the media chassis. The surface 307 forms a platen having a longitudinal edge 307a spaced from, inbound of and parallel to the deflector front edge. An ASF deflector 510 (FIG. 20) with integral pins is mounted to walls 304, 305. Apertures 334 of the media chassis support the prescan roller. The deflector has opposite longitudinal edges 511 which extend over and between prescan drive element 501 and its rollers 501a. Slots and apertures 334a support the deflector. A thin prescan paper guide 515 extends above the ASF deflector 510, the indents 515a thereof spanning rollers 501a of the prescan drive element 501. A prescan clutch 522 (FIG. 20) functions to give the pre-scan roller forward motion only. A sensor 513 with a slot interruption 513a, ADF flag 519 which, when paper hits a lever, rotates the plug into the slot 513a, and cable 519a, all in housing 517, function to provide document presence sensing.

As seen in FIG. 21, a solenoid actuator 516 acts to pivot stop swing 515 and in turn against swing arm 514.

The media chassis gearing functions to transmit power to the automatic document feeder (ADF) or alternatively to the automatic sheet feeder (ASF). As seen in FIG. 21, sheet picking is accomplished by first turning the motor pinion 541 by a motor (not shown), in a counterclockwise (ccw) direction. This allows power and control to be transferred from gear 541 to gear 510 through gears 542, 543, 504–509. Gear 510 exerts a force on gear 512 resulting in gear 512 rotating in the clockwise direction. Gear 512 is axially loaded against the swing arm 514 resulting in a friction torque load when it is rotated. As gear 512 is rotated cw a net counter clockwise torque results on the swing arm assembly 514. The swing arm assembly rotates ccw until it stops against swing arm stop 517 in position for gear 512 to engage the ASF gear 513. Continued ccw rotation of the motor results in rotation of the sheet feeder gear and pick shaft allowing for the picking of a sheet from the sheet feeder. The ASF pick shaft rotation is continued for a preset distance to insure that the picked sheet has been stopped by the nip of the prescan roller 501a (FIG. 20) attached to gear 507. Next the motor pinion 541 is rotated in the cw direction resulting in the prescan roller picking up the sheet and transporting it down the paper path for printing. At the same time, the forward direction of the motor results in a cw movement of the swing arm 514 until it is stopped by the stop-swing arm 514a. The stop swing holds the swing arm and thus gear 512 in a neutral position disengaged from both the ASF gear 513 and the ADF gear 511.

Document feeding is accomplished by first energizing the solenoid actuator 516 to pull in its plunger resulting in the stop swing 515 to be rotated out of engagement with the swing arm 514. Next, the motor pinion 541 is turned in the cw direction. This allows power and control to be transferred from gear 541 to gear 510 through gears 542, 543 and 504–509. Gear 510 exerts a force on gear 512 resulting in gear 512 rotating in the ccw direction. Gear 512 is axially loaded against the swing arm 514 resulting in a friction torque load when it is rotated. As gear 512 is rotated ccw a net clockwise torque results on the swing arm assembly 514. The swing arm assembly rotates cw until it stops against swing arm stop 518 in position for gear 512 to engage the ADF gear 511 connected to the ADF pick shaft. Continued cw rotation of the motor pinion 541 allows the ADF pick shaft to pick a document from the input tray. The ADF pick shaft rotation is continued until a paper edge sensor is activated which insures that the picked document has been moved to the nip of the prescan roller attached to gear 507. The solenoid actuator 516 is de-energized resulting in its return spring to force the plunger, stop swing 515, the swing arm 514, and gear 512 to return to the neutral position. The motor pinion 541 cw rotation is continued to move the paper through the paper path for scanning. The next document will not be picked until the solenoid actuator 516 is energized again.

While specific illustrated embodiments have been shown and described, it will be appreciated by those skilled in the art that various modifications, changes and additions can be made to the methods, structures and apparatus of the invention without departing from the spirit and scope of the invention as set forth in the following claims.

We claim:

1. A multiple-function printer comprising:
   a document feeder for holding a stack of documents to be scanned at a scanning station during a scanning mode of operation;
   a sheet feeder for holding a stack of sheets to be printed on at a printing station during a printing mode of operation;
   common path means connected to both said document feeder and said sheet feeder for receiving individual document pages and individual sheet pages;
   common mechanism means for operatively interacting with said common path means to move said individual document pages past said scanning station to an output and to move said individual sheet pages past said printing station to the output;

wherein said common mechanism means includes a first pick for picking a document page from said document feeder during said scanning mode of operation and a second pick for picking a sheet page from said sheet feeder during said printing mode of operation; and a media chassis including a fixed platen, for transporting either a document page or a sheet page from the respective feeders, and an integral pair of spaced side walls extending from said platen and supporting the scanner station and connected to the printer station; said first pick and said second pick being rotatively mounted to at least one of said walls.

2. The multiple-function printer of claim 1 further including a central aperture in said platen and wherein said first pick includes a single central rotatable roller fixed with respect to said platen, a peripheral surface of said roller being positioned to extend through said central aperture to pick a document page.

3. The multiple-function printer of claim 2 wherein said first pick includes a pick shaft journalled in one of said walls.

4. The multiple-function printer of claim 1 further including a prescan drive roller rotatively mounted in and between said side walls for moving a document page into a scanning station.

5. The multiple-function printer of claim 4 further including a sheet deflector fixedly mounted on and between said walls, said deflector having a front edge positioned over said prescan drive roller, and wherein said platen includes a longitudinal edge spaced from and parallel to said deflector front edge.

6. The multiple-function printer of claim 1 further including a gear train including a series of gears on an outer surface of one of said side walls;

a motor including a pinion for rotatively driving said gear train;

a swing arm rotatable by one of the series of gears;

a swing arm stop fixed on said media chassis; and wherein when said swing arm is engagedly stopped by said stop, a second gear is engaged and continuing rotation of said motor pinion rotates said second pick picking a sheet page from said sheet feeder.

7. The multiple-function printer of claim 6 further including a prescan roller extending between said side walls and wherein said continuing rotation is counterclockwise and continues for a preset distance until stopped by a nip of the prescan roller.

8. The multiple-function printer of claim 7 further including an actuator for rotation of said stop out of engagement with said swing arm and wherein said one gear engages a third gear connected to said first pick for rotatively driving said first pick to pick a document page from said document feeder and wherein, upon deenergation of said actuator, said motor pinion continues to rotate to move a sheet page along said common path means to said scanning station.

9. The multiple-function scanner of claim 1 further including a single output stacker for variously receiving printed pages and scanned documents and wherein said scanning station is positioned below said common path means such that an unscanned side of a scanned document exits onto said stacker unscanned side up and when a printed page next exits onto said stacker a non-printed side of the printed page is in face-to-face position with the unscanned side of the scanned document page.

10. The multiple-function pointer of claim 6 where said motor and said gear train further drive said common mechanism means.

11. The multiple-function printer of claim 1 wherein one of said spaced walls includes a series of gear stub shafts extending from said one wall for supporting gears of a gear train driving said common mechanism means.

12. The multiple-function printer of claim 1 wherein said document feeder is slidingly inserted into said chassis between said walls.

13. A multiple-function printer comprising:

a document feeder for holding a stack of documents to be scanned at a scanning station during a scanning mode of operation;

a sheet feeder for holding a stack of sheets to be printed on as a printing station during a printing mode of operation;

common path means connected to both said document feeder and said sheet feeder for receiving individual document pages and individual sheet pages;

common mechanism means for operatively interacting with said common path means to move said individual document pages past said scanning station to an output stacker and to move said individual sheet pages past said printing station to the output stacker;

wherein said common mechanism means includes a first pick for picking a document page from said document feeder during said scanning mode of operation and a second pick for picking a sheet page from said sheet feeder during said printing mode of operation; and wherein said scanning station is positioned below said common path means such that an unscanned side of a scanned document exits onto said stacker unscanned side up and when a printed page next exits onto said stacker a non-printed side of the printed page is in face-to-face position with the unscanned side of the scanned document page.

* * * * *